(12) United States Patent
Mahmoud et al.

(10) Patent No.: US 11,281,232 B2
(45) Date of Patent: Mar. 22, 2022

(54) SYSTEMS AND METHODS FOR MULTI-AGENT SYSTEM CONTROL USING CONSENSUS AND SATURATION CONSTRAINTS

(71) Applicant: King Fahd University of Petroleum and Minerals, Dhahran (SA)

(72) Inventors: Magdi Sadek Mostafa Mahmoud, Dhahran (SA); Mojeed Opeyemi Oyedeji, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 112 days.

(21) Appl. No.: 16/818,375

(22) Filed: Mar. 13, 2020

(65) Prior Publication Data

US 2021/0286375 A1    Sep. 16, 2021

(51) Int. Cl.
*G05D 1/02* (2020.01)

(52) U.S. Cl.
CPC ......... *G05D 1/0291* (2013.01); *G05D 1/0285* (2013.01); *G05D 2201/0212* (2013.01); *G05D 2201/0213* (2013.01)

(58) Field of Classification Search
CPC .............. G05D 1/0291; G05D 1/0285; G05D 2201/0212; G05D 2201/0213; G08G 1/00

USPC ......................................................... 701/24
See application file for complete search history.

(56) References Cited

U.S. PATENT DOCUMENTS 11,129,236 B1 *   9/2021   Sarsilmaz ........... G06F 16/9024

OTHER PUBLICATIONS

Gao et al., Couple-Group Consensus for Second-Order Multi-Agent Systems with the Effect of Second-Order Neighbours' Information, Mar. 1, 2017, Sage Journals, Transactions of the Institute of Measurement and Control, vol. 40, Issue 5 (Year: 2017).*
Oyedeji, et al. ; Couple-group consensus conditions for general first-order multiagent systems with communication delays ; System & Control Letters 117 ; pp. 37-44 ; Apr. 20, 2018 ; 9 Pages.
Zhao, et al. ; Output Feedback Control for Couple-Group Consensus of Multiagent Systems ; Hindawi Publishing Corporation, vol. 2014 ; Apr. 24, 2014 ; 8 Pages.
Liu, et al. ; Couple-Group Consensus for Multiagent Systems via Time-Dependent Event-Triggered Control; Hindawi Mathematical Problems in Engineering, vol. 2018 ; Sep. 9, 2018 ; 14 Pages.

* cited by examiner

*Primary Examiner* — Nadeem Odeh
(74) *Attorney, Agent, or Firm* — Oblon, McClelland, Maier & Neustadt, L.L.P.

(57) ABSTRACT

Methods, computer readable media, and systems for systems and methods for multi-agent system control using consensus and saturation constraints are described.

20 Claims, 21 Drawing Sheets

SYSTEMS AND METHODS FOR MULTI-AGENT SYSTEM CONTROL USING CONSENSUS AND SATURATION CONSTRAINTS

BACKGROUND

Technical Field

The present disclosure is directed generally to multi-agent systems, and, more particularly, to methods, computer readable media, and systems and methods for multi-agent system control using consensus and saturation constraints.

Background

Multi-agent systems are collections of systems or units working together through a communication network to achieve a common objective. Agents within this network exhibit coordination through a control protocol known to the agents within the network. Coordination control is an aspect of control theory primarily concerned with the design of algorithms and protocols that drive the agents within a multi-agent network to demonstrate some form of intelligent coordination behavior with respect to one or more pre-defined objectives. Research in coordination control is mainly motivated by the desire to have artificial machines demonstrate intelligent coordination that is similar to the behavior demonstrated by biological multi-agent systems such as bird swarms and fish schools. In this regard, coordination control is categorized into the following; consensus, swarming, formation, rendezvous, alignment, containment and circumnavigation.

Consensus is achieved in a multi-agent network when states of the agents reach an agreement with respect to a common objective. Other forms of coordination control can be viewed as a special form of consensus as they involve the states of the agents reaching an agreement. More recently, researchers are focusing on group consensus as a more practical extension of the general consensus. In group consensus, the agents with the network are subdivided into different groups with each group having a decentralized control objective in harmony with the entire multi-agent network.

Previous consensus-related studies concerned stabilizing the states of the agents at a common equilibrium or a desired reference trajectory without regard for optimality with reference to a given objective. Consensus optimality with respect to a cost function is an approach that is becoming popular. The global optimal consensus problem for multi-agent systems with single and double integrator dynamics with bounded controls has been studied. (See, Y. Xie and Z. Lin, "Global optimal consensus for Multiagent systems with bounded controls," *Systems & Control Letters*, vol. 102, pp. 104-111, 2017, which is incorporated herein by reference).

Some approaches have formulated an optimal consensus problem for continuous-time multi-agent systems with time-varying communication topologies. (See, G. Shi and K. H. Johansson, Y. Hong, "Multiagent systems reaching optimal consensus with time-varying communication graphs," in *American Control Conference*, pp. 5456 5461, 2011, which is incorporated herein by reference). This approach included a nonlinear distributed control protocol such that the multi-agent system achieves optimal consensus where the states of the agents reach a global solution in agreement with the agents in the network. Distributed optimization for a class of nonlinear multi-agent systems under the influence of external disturbances has been studied. (See, X. Wang and Y. Hong, H. Ji, "Distributed optimization for a class of nonlinear multi-agent systems with disturbance rejection," IEEE Transactions on Cybernetics, vol. 46, no. 7, pp. 1655-1666, 2016, which is incorporated herein by reference). Using complex analysis and internal model approach, a distributed optimization controller for heterogeneous and nonlinear agents has been proposed. Dynamic optimization for continuous-time multi-agent systems with double integrator dynamics has been studied. (See, Y. Zhang and Y. Hong, "Distributed optimization design for second-order Multi-agent Systems," in Proceedings of the 33rd Chinese Control Conference, pp. 1755-1760, 2014, which is incorporated herein by reference). Using a distributed gradient-based design, studies have described the convergence of the multi-agent system using Lyapunov analysis. Distributed optimization for second order multi-agent systems with convex objective functions subject to some bound constraints has been studied. (See, J. Wang and Q. Liu, "A second-order Multiagent network for bound-constrained distributed optimization," IEEE Transaction on Automatic Control, vol. 60, no. 12, pp. 3310-3315, 2015, which is incorporated herein by reference). In this study it was shown that a multi-agent system reaches consensus at the optimal solution under some mild assumptions.

A distributed protocol based on a gradient algorithm and integral feedback for a class of high-order integrator multi-agent system has been proposed. (See, Y. Zhang and Y. Hong, "Distributed optimization design for second-order Multiagent systems," in Proceedings of the 33rd Chinese Control Conference, pp. 1755-1760, 2014, which is incorporated herein by reference). Sufficient conditions were derived for the control parameters to make the agents converge to an optimal solution of the distributed optimization problem.

The consensus problem for networked multi-agent systems with single integrator dynamics with fixed topology having input saturation constraints has been studied. (See, Y. Li, J. Xiang, W. Wei, "Consensus problems for linear time-invariant Multiagent systems with saturation constraints," IET Control Theory and Applications, vol. 5, no. 6, pp. 823-829, 2011, which is incorporated herein by reference). It was demonstrated that under saturation constraints, the general consensus protocol widely used in literature remains valid. Global optimal consensus for discrete-time multi-agent systems was studied. (See, Y. Li, J. Xiang, W. Wei, "Consensus problems for linear time-invariant Multi-agent systems with saturation constraints," IET Control Theory and Applications, vol. 5, no. 6, pp. 823-829, 2011, which is incorporated herein by reference). In that study, some necessary conditions for achieving global consensus using relative state measurements of each agent and its neighbors were derived.

Leader-follower consensus for a group of agents with identical linear systems subject to control input saturation was studied. (See, Z. Meng, Z. Zhao, Z. Lin "On global leader-following consensus of identical linear dynamic systems subject to actuator constraints," Systems & Control Letters, vol. 62, pp. 132-142, 2013, which is incorporated herein by reference). It was demonstrated that for neutrally stable systems, global consensus can be achieved by linear local feed-back laws over a fixed communication topology and with properly selected potential functions, global consensus can be achieved over a switching topology.

Leader-following consensus of a linear multi-agent system on a switching network subject to input saturation was discussed in a study. (See, H. Su, M. Z. Q. Chen, J. Lam, Z.

Lin, "Semi-global leader-following consensus of linear Multiagent systems with input saturation via low gain feedback," IEEE Transactions on Circuits and Systems I: Regular Papers, vol. 60, no. 7, pp. 1881-1889, 2013, which is incorporated herein by reference). Using low gain feedback-based consensus protocols, it was deduced that under the assumptions, each agent is asymptotically null controllable with bounded controls and the network is connected, or joint connected, semi-global leader-follower consensus can be achieved. The output synchronization problem for heterogeneous networks of invertible linear agents subject to actuator saturation was studied. (See, T. Yang, A. A Stoorvogel, H. F. Grip, A. Saberi, "Semi-global regulation of output synchronization for heterogeneous networks of non-introspective, invertible agents subject to actuator saturation," International Journal of Robust and Nonlinear Control, vol. 24, no. 3, pp. 548-566, 2014, which is incorporated herein by reference). The output of each agent was regulated using a priori information from a reference model.

In group consensus, the multi-agent network is required to converge to more than a single consensus state depending on the topology of the graph. (See, J. Qin, C. Yu, "Cluster consensus control of generic linear Multiagent systems under directed topology with acyclic partition Automatica," vol. 49, pp. 2898-2905, April 2013; and Y. Xie and Z. Lin, "Global optimal consensus for Multiagent systems with bounded controls," Systems & Control Letters, vol. 102, pp. 104-111, 2017, which are incorporated herein by reference).

Some implementations were conceived in light of one or more of the above-mentioned problems.

SUMMARY

Some implementations can include computer-implemented method for controlling a multi-agent autonomous vehicle system including two or more autonomous vehicle systems using group consensus protocol, the two or more autonomous vehicle systems being connected via a network. The method can include dividing each of the two or more autonomous vehicle systems into two or more subgroups each having one or more agents, wherein each agent includes one or more processors in an autonomous vehicle, and determining two or more consensus states, wherein each subgroup of the two or more subgroups has a single objective function known to each agent of the subgroup, wherein each consensus state minimizes the single objective function corresponding to the subgroup, and wherein the two or more consensus states satisfy conditions corresponding to a sum of a first derivative of the single objective function for each agent of each corresponding subgroup being equal to zero. The method can also include controlling the two or more autonomous vehicle systems according to the two or more consensus states.

In some implementations, the two or more autonomous vehicle systems are stable at the two or more consensus states. In some implementations, the two or more autonomous vehicle systems are represented by one of a single integrator or a double integrator. In some implementations, input to the two or more autonomous vehicle systems is bounded. In some implementations, the single objective function is a decentralized objective function.

The method can further include receiving input at the two or more autonomous vehicle systems, wherein the input includes saturated input. The method can also include receiving input at the two or more autonomous vehicle systems, wherein the input includes unsaturated input.

Some implementations can include a multi-agent system comprising two or more computer-based systems controlled according to a computerized control system including a group consensus protocol, the two or more computer-based systems being connected via a network, wherein each of the two or more computer-based systems include two or more subgroups each having one or more agents, wherein the one or more agents comprise one or more corresponding processors. The computerized control system is configured to perform operations. The operations can include determining two or more consensus states, wherein each subgroup of the two or more subgroups has a single objective function known to each agent of the subgroup, wherein each consensus state minimizes the single objective function corresponding to the subgroup, and wherein the two or more consensus states satisfy conditions corresponding to a sum of a first derivative of the single objective function for each agent of each corresponding subgroup being equal to zero. The operations can also include controlling the two or more computer-based systems according to the two or more consensus states.

In some implementations, the two or more computer-based systems are stable at the two or more consensus states. In some implementations, the two or more computer-based systems are represented by one of a single integrator or a double integrator. In some implementations, input to the two or more computer-based systems is bounded. In some implementations, the single objective function is a decentralized objective function.

The operations can also include receiving input at the two or more computer-based systems, wherein the input includes saturated input. The operations can further include receiving input at the two or more computer-based systems, wherein the input includes unsaturated input.

Some implementations can include a non-transitory computer readable medium having instructions stored therein that, when executed by one or more processors, cause the one or more processors to perform a method to control a multi-agent system including two or more systems using group consensus protocol, the two or more systems being connected via a network. The method can include dividing each of the two or more systems into two or more subgroups each having one or more agents. The method can also include determining two or more consensus states, wherein each subgroup of the two or more subgroups has a single objective function known to each agent of the subgroup, wherein each consensus state minimizes the single objective function corresponding to the subgroup, and wherein the two or more consensus states satisfy conditions corresponding to a sum of a first derivative of the single objective function for each agent of each corresponding subgroup being equal to zero. The method can further include controlling the two or more systems according to the two or more consensus states.

In some implementations, the two or more systems are stable at the two or more consensus states. In some implementations, the two or more systems are represented by one of a single integrator or a double integrator. In some implementations, the single objective function is a decentralized objective function.

The method can also include receiving input at the two or more systems, wherein the input includes saturated input. The method can further include receiving input at the two or more systems, wherein the input includes unsaturated input.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
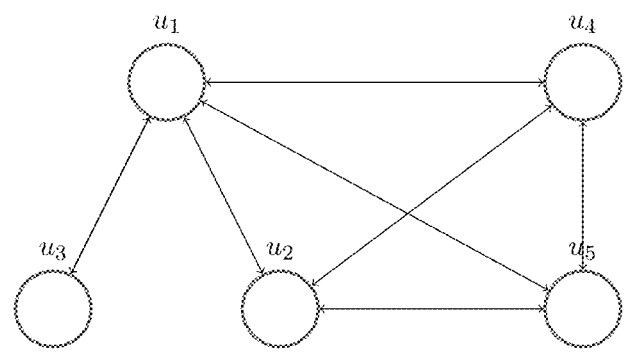
FIG. 1 is a diagram of an example multi-agent system in accordance with some implementations.
Figure 2:
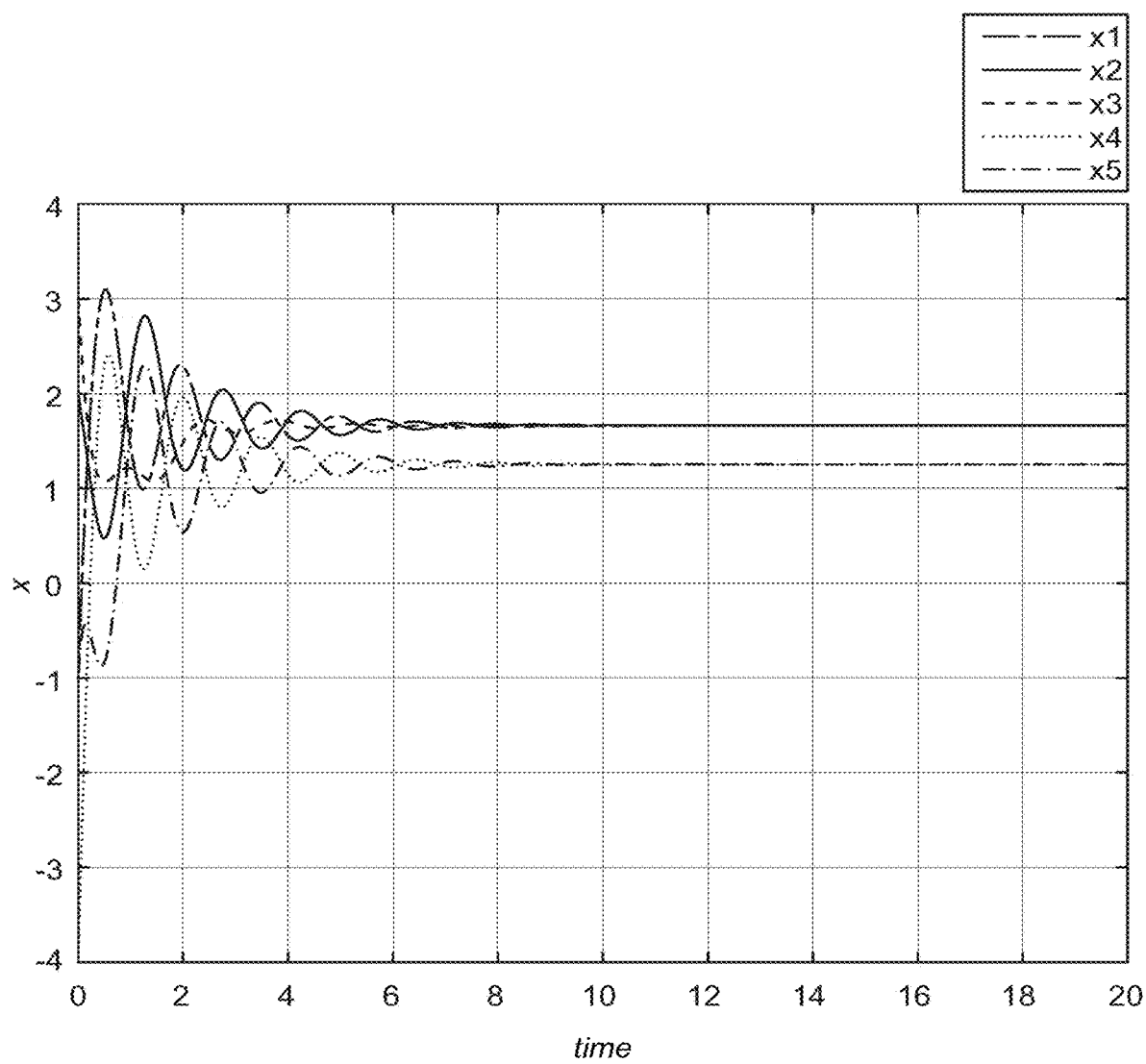
FIG. 2 is a graph showing states of an example single integrator multi-agent system without input saturation in accordance with some implementations.
Figure 3:
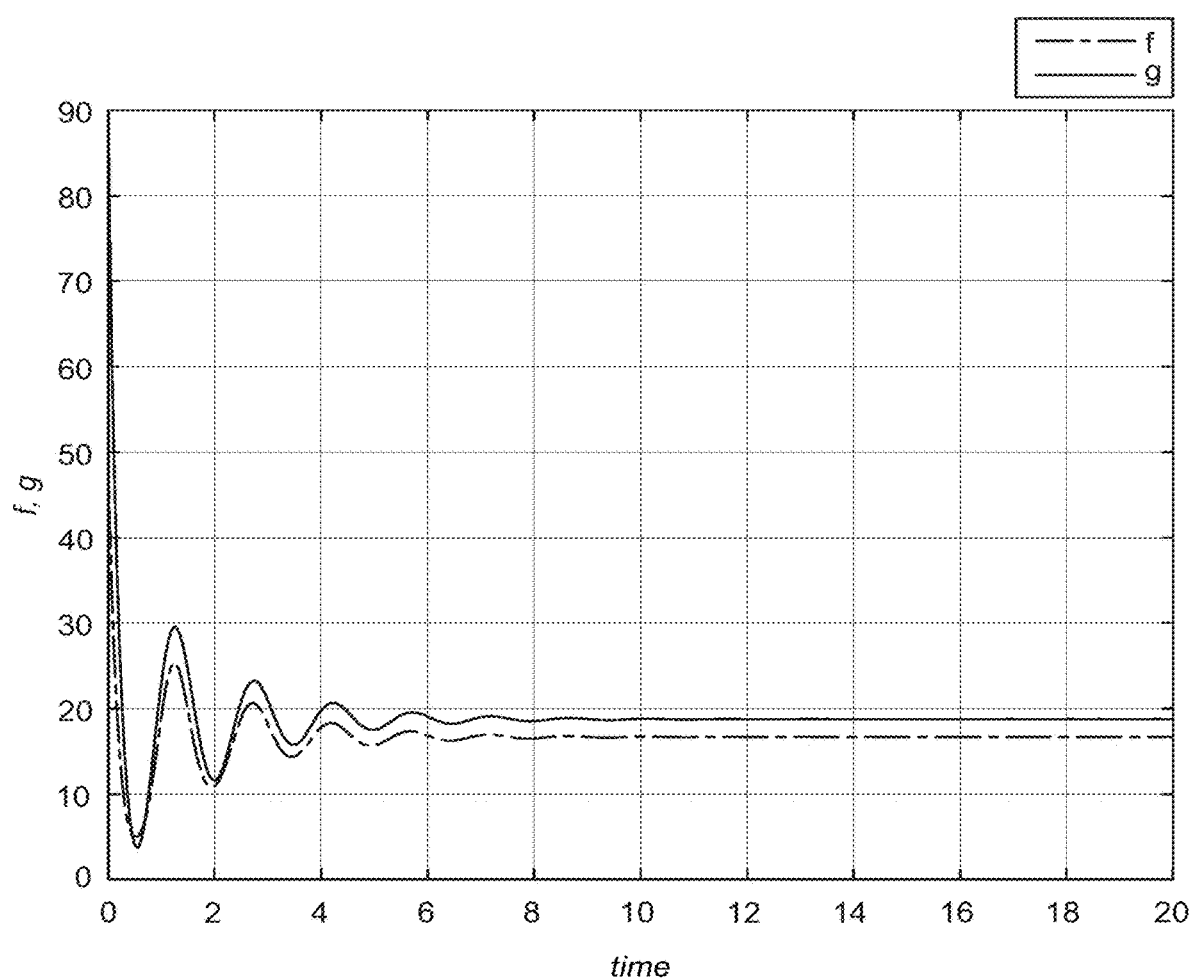
FIG. 3 is a graph showing group objective functions of an example single integrator multi-agent system without input saturation in accordance with some implementations.
Figure 4:
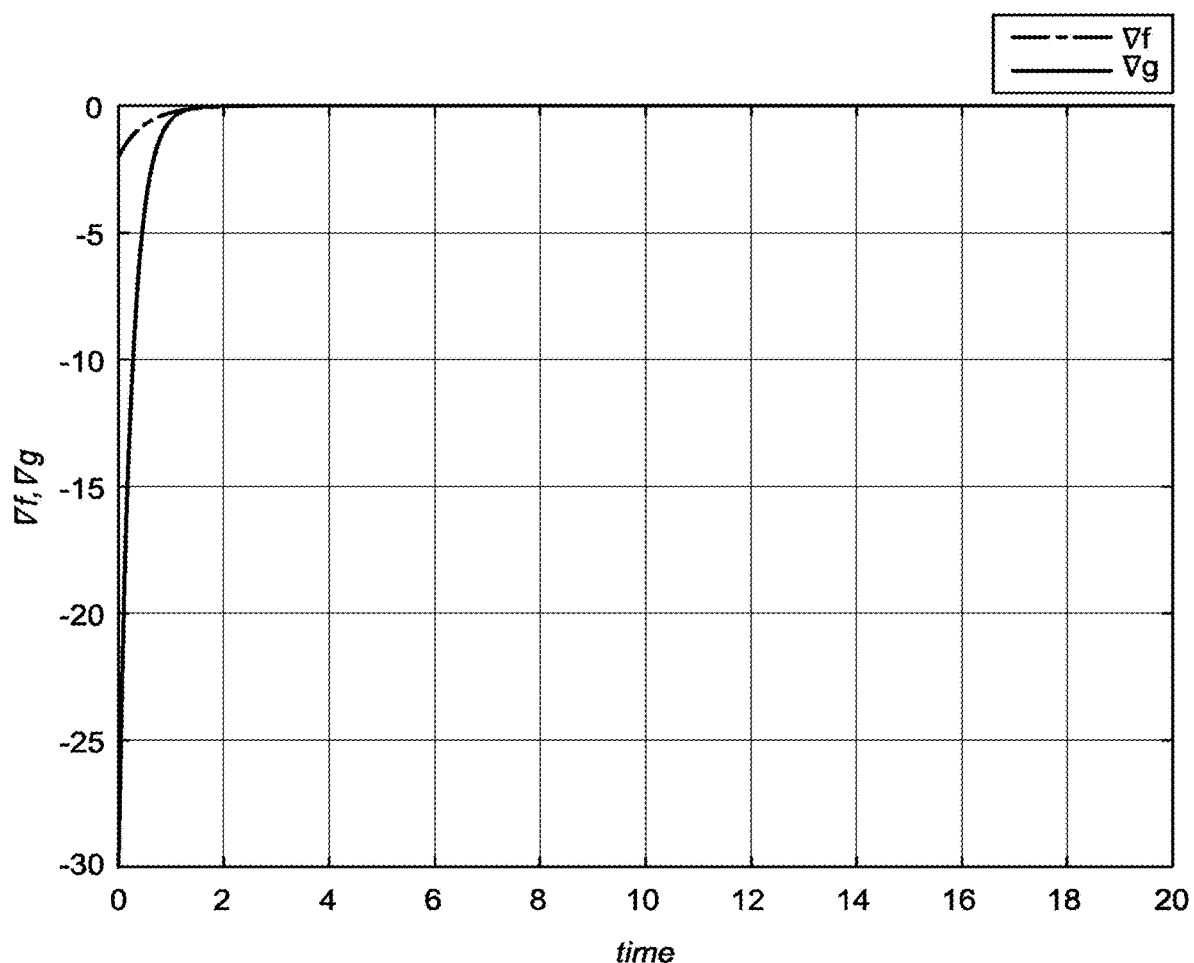
FIG. 4 is a graph showing a gradient of the group objective functions for an example single integrator multi-agent system without input saturation in accordance with some implementations.
Figure 5:
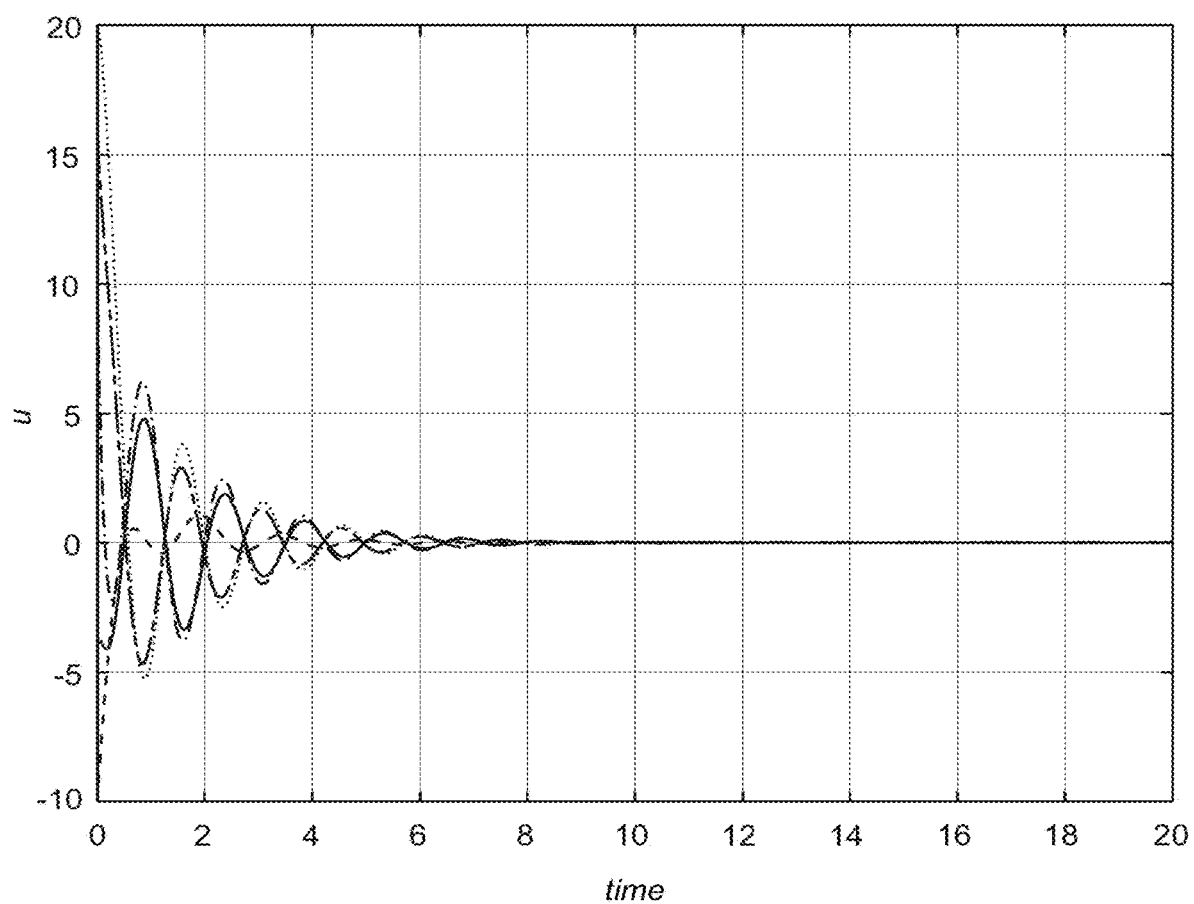
FIG. 5 is a graph showing control inputs of an example single integrator multi-agent system without input saturation in accordance with some implementations.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

A multi-agent system (or MAS or "self-organized system") is a computerized system comprising one or more intelligent agents that can be configured to interact with each other and communicate with each other. Multi-agent systems can solve problems that may be difficult for an individual agent or system to solve.

Multi-agent systems have been applied in academic research and in industry. Some implementations of multi-agent systems can be applied to graphical applications such as computer games. Some implementations can include media applications and coordinated defense systems. Other applications of the multi-agent systems and control techniques of the present disclosure can include transportation, logistics, graphics, manufacturing, power system, smart grids, and geographic information systems (GIS). Some implementations can include networking and mobile technologies, for example, to achieve automatic and dynamic load balancing, high scalability and self-healing networks.

Multi-agent systems can provide a solution to distributed system problems. In a distributed system, data, control signals or actions, or a combination of the above can be distributed. A multi-agent architecture can be a suitable framework for problem solving in situations where global knowledge about the status of a system is complex or difficult to acquire in a single entity. For example, in vehicle applications, there exist a great number of scenarios of a distributed nature, such as traffic coordination, routes load balancing problems, traffic negotiation among the infrastructure and cars. Further, autonomous vehicles include features that may benefit from new methods of communication, negotiation, cooperation, such as car to car communication, car to infrastructure negotiation, or infrastructure to infrastructure communication.

As industry continues to move toward autonomous vehicles, technologies are needed to make mobility safer and provide an optimized system for moving people or goods. Some implementations can include multi-agent system control for autonomous vehicles. Other implementations can include multi-agent systems where internet of things (IoT) devices are part of the design.

Multi-agent systems can be applied to automotive applications, such as traffic management and load balancing and the agents can represent different actors in the implementation of the solution. For example, in some implementations, there can be multiple types of agents such as pedestrians, vehicles, traffic lights, streets, and parking lots.

Implementations represent an improvement to the functions of computers as applied to computerized multi-agent systems and can include control system providing optimal group consensus for first and second order multi-agent systems using group consensus protocols, where the multi-agent systems can be represented with first and second order integrator dynamics. Some implementations can include group consensus protocols for multi-agent systems with and without input saturation. Input saturation can include configurations in which an input signal to a system (e.g., a linear system with an integrator) is smaller than the control input generated by the controller. As described below, Lyapunov theory is used to demonstrate stability and convergence to a terminal state that minimizes group objective functions.

Some implementations can include optimal group consensus protocols for multi-agent systems exhibiting single and double integrator dynamics with and without input saturation. Some implementations can include couple-group consensus where each subgroup has a unique objective function known to agents within the respective sub-group.

Consensus in multi-agent systems relates to the agreement or consensus problem in multi-agent systems that concerns processes by which a collection of interacting agents achieve a common goal. Agreement or consensus in multi-agent systems can include driving states of the agents to reach a common value or be within a threshold amount of a common value using local interactions.

Graph theory is a standard framework for representing connections and interactions between networked, distributed or multi-agent systems. A graph $\mathcal{G}$ (V,ε) is defined as a pair consisting of vertices V and edges ε.

V($\mathcal{G}$) represents the set of vertices in $\mathcal{G}$ and ε($\mathcal{G}$) is the edge set of $\mathcal{G}$. A graph is said to be undirected when the edge between any pair of vertices has no orientation. Conversely, in a directed graph or digraph, each edge e∈ε($\mathcal{G}$) is directed between any pair of vertices, that is, the edge e=$v_i v_j$, originates at vertex $v_i$ and terminates at vertex $v_j$. In a simple graph, there are no self-loops or multiple edges between vertices. In a complete graph, every pair of vertices is connected.

Some special matrices are used to describe the properties and information in a graph. These matrices include degree, adjacency, incidence, and Laplacian matrices. For a graph on n vertices and m edges, the degree matrix $\Delta(\mathcal{G}) \in \mathcal{R}^{n \times n}$, is a diagonal matrix, with elements on the diagonal representing the degree $d(v_i)$ of each vertex. $d(v_i)$ is the sum of edges incident to the vertex $v_i$. The adjacency matrix $\mathcal{A}(\mathcal{G})$ is a symmetric n×n matrix describing the adjacency relationship in $\mathcal{G}$. Each $a_{ij} \in \mathcal{A}(\mathcal{G})$ assume 1 if $v_i v_j \in \varepsilon(\mathcal{G})$ and 0 otherwise. The Laplacian matrix in an undirected graph $\mathcal{L}(\mathcal{G}) = \Delta(\mathcal{G}) - \mathcal{A}(\mathcal{G})$. The incidence matrix W of a directed graph $\mathcal{D}$, is defined as $W=[w_{ij}]$. $w_{ij}=-1$ if $v_i$ is the tail of $e_j$, $w_{ij}=1$ if $v_i$ is the head of $e_j$ and $w_{ij}=0$ if $v_i$ is not adjacent to $e_j$. The Laplacian matrix of a directed graph $\mathcal{D}$ is $\mathcal{L}(\mathcal{D}) = W(\mathcal{D}) W(\mathcal{D})^T$.

The directed graph $\mathcal{G}$ is strongly connected and detailed balanced. Let $P = \text{diag}\{\omega\} \mathcal{L} = [p_{ij}] \in \mathcal{R}^{N \times N}$ where $\text{diag}\{\omega\} = \text{diag}\{\omega_1, \omega_2, \ldots, \omega_N\}$ with $\omega > 0$ 1, 2, ..., N. Going by the definition of detailed balanced graph, produces $\text{diag}\{\omega\} \mathcal{L} = \mathcal{L}^T \text{diag}\{\omega\}$, which implies that $P = P^T$. Since $\mathcal{L} 1^N = 0$, then $P1_N = \text{diag}\{\omega\} \mathcal{L} = 0$, therefore P is a valid symmetric Laplacian matrix.

Lemma 1: Under Assumption 1, P is positive semidefinite, and all the eigenvalues of P are nonnegative and real. Moreover, 0 is a single eigenvalue of P.

Problem Statement

Definition 1: A function $f: \mathcal{R}^i \rightarrow \mathcal{R}$ is convex if for any x,y∈$\mathcal{R}^m$ for $$f(\tau x+(1-\tau)y) \leq \tau f(x)+(1-\tau)f(y), \tau \in [0,1] \quad (1)$$

(See, Y. Xie and Z. Lin, "Global optimal consensus for Multiagent systems with bounded controls," Systems & Control Letters, vol. 102, pp. 104-111, 2017, which is incorporated herein by reference).

A function is strictly convex if strict inequality holds in (1) wherever x≠y and 0<τ<1. Strict convexity of a function can be verified via the following criteria:

First order condition: Assume that $f$ is differentiable. Then, $f$ is strictly convex if and only if $(y-x)^T(\nabla f(y) - \nabla f(x)) > 0$ for all x,y∈$\mathcal{R}^m$, x≠y Second order condition: Assume that $f$ is twice differentiable, that is, $\nabla^2 f$ exists. If $\nabla^2 f(x) > 0$ for all x∈$\mathcal{R}^m$, then $f$ is strictly convex.

Consider a network consisting of n+m multiagent systems belonging to subgroup 1 and 2 respectively, described by the following first-order dynamics.

$$\dot{x}_i^{(p)}(t) = u_i(t) \quad (2)$$

where $x_i \in \mathcal{R}^{n+m}$ are the states and $x_i^{(p)} \in \mathcal{R}^{n+m}$ represents the pth derivative of $x_i$, $u_i \in \mathcal{R}^{n+m}$ is the bounded control input of agent i, $\|u_i\| \leq u_{max}$ for some positive scalar $u_{max}$. n and m are the number of agents in subgroup $X_1$ and $X_2$, respectively.

Each subgroup has its own objective function $f(x_a)$ and $g(x_b)$ to minimize with the following assumptions on the objective functions.

Assumption 2. The objective functions $f: \mathcal{R}^n \rightarrow \mathcal{R}$; i=1, 2, ..., n, g: $\mathcal{R}^m \rightarrow \mathcal{R}$; i=n+1, n+2, ..., n+m representing subgroups $X_1$ and $X_2$ respectively are twice differentiable and $\nabla^2 f(x_a) > 0$, $\nabla^2 g(x_b) > 0$ for all x∈$\mathcal{R}^{n+m}$.

Some implementations can include systems and methods to solve a global optimal couple-group consensus problem for a network of multiagent systems. For the multiagent system described by the dynamics in (2), a bounded optimal control protocol is constructed for each agent I in each subgroup, that uses information of other agents within its own subgroup and other subgroups, the information of the group objective function under which the multiagent system achieves group consensus at a state χ* that minimizes the group $f(x_a) = \sum_{i=1}^{m} f_i(x_a)$ and $g(x_b) = \sum_{i=n+1}^{n+m} g_i(x_b)$ where the convex function $f(x_a): \mathcal{R}^n \rightarrow \mathcal{R}$, $g(x_b): \mathcal{R}^m \rightarrow \mathcal{R}$ is only known to agent i within each subgroup, that is $x_a^*$ and $x_b^*$ is the solution to the following optimization problem $$\min_{x_a \in \mathcal{R}^n} f(x_a) \quad (3)$$

$$\min_{x_b \in \mathcal{R}^m} g(x_b) \quad (4)$$

$x_a = [x_1, x_2, \ldots, x_n]$ and $x_b = [x_{n+1}, x_{n+2}, \ldots, x_{n+m}]$ represents the agents in subgroup $X_1$ and $X_2$ respectively.

The network of multiagent system described by the dynamics in (2), achieves global optimal couple-group consensus at a state x* minimizing the group objective functions in (3) while satisfying the following conditions.

$$\lim_{t \to \infty} \|x_i^*(t) - x_j^*(t)\| = 0, \forall i, j \in \chi_1$$

$$\lim_{t \to \infty} \|x_i^*(t) - x_j^*(t)\| = 0, \forall i, j \in \chi_2$$

Since $f(x_a)$ and $g(x_b)$ are assumed to be strictly convex, the optimal consensus states $x_a$ and $x_b^*$ satisfies the following optimality condition for both subgroups:

$$\nabla f(x_a^*) = \sum_{i=1}^{n} \nabla f_i(x_a^*) = 0 \quad (5)$$

$$\nabla g(x_b^*) = \sum_{i=n+1}^{n+m} \nabla g_i(x_b^*) = 0;$$

Lemma 2: Ren and Beard (2008) For a graph G with one connected component and Laplacian $\mathcal{L}$, suppose that $\mathcal{L} = [l_{ij}] \in \mathcal{R}^{n \times n}$ satisfy $l_{ij} < 0$, $i \neq j$ and $\Sigma_{j=1}^n l_{ij} = 1, 2, \ldots, n$, then the following conditions are equivalent:

$\mathcal{L}$ has a simple zero eigenvalue and all other eigenvalues have positive real parts;

$\mathcal{L}x = 0$ implies that $x_1 = x_2 = \ldots x_n$;

Consensus is reached asymptotically for the system $\dot{x} = -\mathcal{L}x$; and The directed graph of $\mathcal{L}$ has a directed spanning tree the rank of $\mathcal{L}$ is n−1.

A digraph $\mathcal{G}_i = \{V_i, \varepsilon_i, \mathcal{A}_i\}$ is said to be a subgraph of $\mathcal{G} = \{V, \varepsilon, \mathcal{A}\}$ if, (a) $V_i \subseteq V$, (b) $\varepsilon_i \subseteq \varepsilon$, (c) $\mathcal{A}_i$ is inherited directly from $\mathcal{A}$. The following result is recalled:

Lemma 3: Let $G_n$ be a graph on with n vertices and m connected components. (See, W. Ren, R. W Beard, "Distributed Consensus in Multi-vehicle Cooperative Control" Springer. Springer-Verlag, London, 2008, which is incorporated herein by reference). If $\mathcal{L}_n$ is the Laplacian of G, then rank($\mathcal{L}$) = n−m.

The MAS network described by the directed graph $\mathcal{G} = \{V, \varepsilon, \mathcal{A}\}$ can be partitioned into two subgroups $\mathcal{G}_i = \{V_1, \varepsilon_1, \mathcal{A}_1\}$ and $\mathcal{G}_2 = \{V_2, \varepsilon_2, \mathcal{A}\}$. Therefore, the graph Laplacian $\mathcal{L}$ can be written as $$\mathcal{L} = \begin{bmatrix} \mathcal{L}_{11} & \mathcal{L}_{12} \\ \mathcal{L}_{21} & \mathcal{L}_{22} \end{bmatrix}, \mathcal{L}_{11} \in \mathcal{R}^{n \times n}$$

and $\mathcal{L}_{22} \in \mathcal{R}^{m \times m}$ an are Laplacians of the subgraphs $G_1$ and $G_2$ respectively. $\mathcal{L}_{21} = \mathcal{L}_{12}^T$ is the Laplacian representing the interconnection between the two subgraphs.

In the following section, a solution is presented to the global group consensus problem for multiagent systems exhibiting first and second order integrator dynamics (that is, p=1 and p=2), with and without input saturation.

Single Integrator Dynamics without Input Saturation

A network of multiagent systems is described by graph G consisting of n+m agents described by the following single integrator dynamics:

$$\dot{x}_i = u_i \qquad (6)$$

The group consensus protocol for the multi-agent system in (6) can include:

$$u_i(t) = \begin{cases} -z_i + \alpha_1 \sum_{\substack{j=1 \\ j \neq i}}^n a_{ij}(x_j(t) - x_i(t)) \\ + \beta_1 \sum_{\substack{j=n+1 \\ j \neq i}}^{n+m} a_{ij} x_j(t) - \gamma_1 \nabla f_i(x) \forall \; i \in \mathcal{G}_1 \\ -z_i + \alpha_2 \sum_{\substack{j=n+1 \\ j \neq i}}^{n+m} a_{ij}(x_j(t) - x_i(t)) \\ + \beta_2 \sum_{\substack{j=1 \\ j \neq i}}^n a_{ij} x_j(t) - \gamma_2 \nabla g_i(x) \forall \; i \in \mathcal{G}_2 \end{cases} \qquad (7)$$

$$\dot{z}_i(t) = \begin{cases} \alpha_1 \beta_1 \sum_{\substack{j=1 \\ j \neq i}}^n a_{ij}(x_i(t) - x_j(t)) \forall \; i \in \mathcal{G}_1 \\ \alpha_2 \beta_2 \sum_{\substack{j=1 \\ j \neq i}}^{n+m} a_{ij}(x_i(t) - x_j(t)) \forall \; i \in \mathcal{G}_2 \end{cases} \qquad (8)$$

where 1 and 2 are positive intra-group coupling gains. The closed loop dynamics under protocol (7) can be written as:

$$\dot{x}_a = -\alpha_1 \mathcal{L}_{11} x_a + \beta_1 \mathcal{L}_{12} x_b - \gamma_1 \nabla F(x_a) - z_a \qquad (9)$$

$$\dot{x}_b = -\alpha_2 \mathcal{L}_{22} x_b + \beta_1 \mathcal{L}_{21} x_a - \gamma_2 \nabla G(x_b) - z_b \qquad (10)$$

$$\dot{z}_a = \alpha_1 \beta_1 \mathcal{L}_{11} x_a \qquad (11)$$

$$\dot{z}_b = \alpha_2 \beta_2 \mathcal{L}_{22} x_b \qquad (12)$$

where $X_a = [x_1, x_2, \ldots, x_n]^T$, $x_b = [x_{n+1}, x_{n+2}, \ldots, x_{n+m}]^T$, $z_a = [z_1, z_2, \ldots, z_n]^T$, $z_b = [z_{n+1}, z_{n+2}, \ldots, z_{n+n}]^T$ The multiagent system described by the first-order dynamics (6) achieves a stable optimal group consensus under control protocol (7) at $x^0 = x^*$ satisfying optimality conditions (5).

As shown below, the system reaches a consensus at an equilibrium that satisfies the optimality condition (5) and the multi-agent system reaches global asymptotic stability at the equilibrium point.

At equilibrium, $\dot{x}_a$, $\dot{x}_b$, $\dot{z}_a$, $\dot{z}_b = 0$ and $x_a \to x_a^0$, $x_b \to x_b^0$. Therefore, at equilibrium, (9)-(12) becomes:

$$-\alpha_1 \mathcal{L}_{11} x_a^0 + \beta_1 \mathcal{L}_{12} x_b^0 - \gamma_1 \nabla F(x_a^0) - z_a^0 = 0 \qquad (13)$$

$$-\alpha_2 \mathcal{L}_{22} x_b^0 + \beta_1 \mathcal{L}_{21} x_a^0 - \gamma_2 \nabla G(x_b^0) - z_b^0 = 0 \qquad (14)$$

$$\alpha_1 \beta_1 \mathcal{L}_{11} x_a^0 = 0 \qquad (15)$$

$$\alpha_2 \beta_2 \mathcal{L}_{22} x_b^0 = 0 \qquad (16)$$

Left multiplying equations (11) and (12) by $1_n^T$ and $1_m^T$ respectively yields, $$1_n^T \dot{z}_a = \alpha_1 \beta_1 1_n^T \mathcal{L}_{11} x_a$$

$$1_m^T \dot{z}_b = \alpha_2 \beta_2 1_m^T \mathcal{L}_{22} x_b \qquad (17)$$

Applying Lemma 2, produces $$\sum_{i=1}^n \dot{z}_i = 0 \qquad (18)$$

$$\sum_{i=n+1}^{n+m} \dot{z}_i = 0$$

which also implies that $$\sum_{i=1}^n z_i = 0 \qquad (19)$$

$$\sum_{i=n+1}^{n+m} z_i = 0$$

Similarly, left multiplying (13) and (14) by $1_n^T$ and $1_m^T$ respectively, to arrive at:

$$-\alpha_1 1_n^T \mathcal{L}_{11} x_a^0 + \beta_1 1_n^T \mathcal{L}_{12} x_b^0 - \gamma_1 1_n^T \nabla F(x_a^0) - 1_n^T z_a^0 = 0$$

$$-\alpha_2 1_m^T \mathcal{L}_{22} x_b^0 + \beta_1 1_m^T \mathcal{L}_{21} x_a^0 - \gamma_2 1_m^T \nabla G(x_b^0) -$$
$$1_n^T z_b^0 = 0$$

Again Lemma 2 is applied to arrive at $$-\gamma_1 \sum_{i=1}^{n} \nabla f_i(x_a^0) - \sum_{i=1}^{n} z_i^0 = 0 \quad (20)$$

$$-\gamma_2 \sum_{i=n+1}^{n+m} \nabla g_i(x_a^0) - \sum_{i=n+1}^{n+m} z_i^0 = 0$$

Substituting the relation in (19) into (20), yields the optimality condition in (5).

Hence, the optimality conditions for both subgroups are satisfied at the equilibrium points $x_a^0$ and $x_b^0$ respectively. Consider the following Lyapunov candidate for the multi-agent system.

$$V(x) = \frac{1}{2} x_a^T x_a + \frac{1}{2} x_b^T x_b \quad (21)$$

The time derivative of the Lyapunov equation along the trajectory of the closed loop system is:

$$\dot{V}(x) = x_a^T \dot{x}_a + x_b^T \dot{x}_b \quad (22)$$

$$\dot{V}(x) = x_a^T(-\alpha_1 \mathcal{L}_{11} x_a + \beta_1 \mathcal{L}_{12} x_b - \gamma_1 \nabla F(x_a) - z_a) +$$
$$x_b^T(-\alpha_2 \mathcal{L}_{22} x_b + \beta_1 \mathcal{L}_{21} x_a - \gamma_2 \nabla G(x_b) - z_b)$$

$$\dot{V}(x) = -\alpha_1 x_a^T \mathcal{L}_{11} x_a + \beta_1 x_a^T \mathcal{L}_{12} x_b - \gamma_1 x_a^T \nabla F(x_a) - x_a^T z_a -$$
$$\alpha_2 x_b^T \mathcal{L}_{22} x_b + \beta_2 x_b^T \mathcal{L}_{21} x_a - \gamma_2 x_b^T \nabla G(x_b) - x_b^T z_b$$

$$\dot{V}(x) = -\alpha_1 x_a^T \mathcal{L}_{11} x_a - \alpha_2 x_b^T \mathcal{L}_{22} x_b + x_a^T(\beta_1 \mathcal{L}_{12} x_b - \gamma_1 \nabla F(x_a) - z_a) +$$
$$x_b^T(\beta_2 \mathcal{L}_{21} x_a - \gamma_2 \nabla G(x_b) - z_b)$$

A manifold S is defined as follows:

$$S = \{(x, v) : \dot{V} \le 0 | \Lambda_1 = 0, \Lambda_2 = 0\} \quad (23)$$

where $\Lambda_1 = \beta_1 \mathcal{L}_{12} x_b - \gamma_1 \nabla F(x_a) - z_a$ and $\Lambda_2 = \beta_2 \mathcal{L}_{21} x_a - \gamma_2 \nabla G(x_b) - z_b$. If $x_a = x_a^0$ and $x_b = x_b^0$, results in Applying Lemma 2 yields:

$$z_a^0 + \gamma_1 \gamma F(x_a^0) = 0 \quad (24)$$

$$z_b^0 + \gamma_2 \nabla G(x_b^0) = 0 \quad (25)$$

Left multiplying by $I_n$ and $I_m$, yields $$\sum_{i=1}^{n} z_i^0 + \gamma_1 \sum_{i=1}^{n} \nabla f_i(x_a^0) = 0 \quad (26)$$

$$\sum_{i=n+1}^{n+m} z_i^0 + \gamma_2 \sum_{i=n+1}^{n+m} \nabla g_i(x_b^0) = 0$$

Substituting (19) into (26), the optimality condition (5) is determined. This shows that global asymptotic stability exists at the equilibrium point that minimizes the group objective functions $f(x)$ and $g(x)$.

Single Integrator Dynamics with Input Saturation

In the section below, the optimality of a group consensus protocol under input saturation is described. For example, a consensus protocol can include the form shown in (27), $$u_i(t) = \begin{cases} \sigma_\psi\left(-z_i + \alpha_1 \sum_{\substack{j=1 \\ j \ne i}}^{n} a_{ij}(x_j(t) - x_i(t))\right. \\ \left. + \beta_1 \sum_{\substack{j=n+1 \\ j \ne i}}^{n+m} a_{ij} x_j(t) - \gamma_1 \nabla f_i(x)\right) \forall i \in \mathcal{G}_1 \\ \sigma_\psi\left(-z_i + \alpha_2 \sum_{\substack{j=n+1 \\ j \ne i}}^{n+m} a_{ij}(x_j(t) - x_i(t))\right. \\ \left. + \beta_2 \sum_{\substack{j=1 \\ j \ne i}}^{n} a_{ij} x_j(t) - \gamma_2 \nabla g_i(x)\right) \forall i \in \mathcal{G}_2 \end{cases} \quad (27)$$

$$\dot{z}_i(t) = \begin{cases} \alpha_1 \beta_1 \sum_{\substack{j=1 \\ j \ne i}}^{n} a_{ij}(x_i(t) - x_j(t)) \forall i \in \mathcal{G}_1 \\ \alpha_2 \beta_2 \sum_{\substack{j=1 \\ j \ne i}}^{n+m} a_{ij}(x_i(t) - x_j(t)) \forall i \in \mathcal{G}_2 \end{cases} \quad (28)$$

where 1 and 2 are positive intra-group coupling gains. For example, 1, 2 are positive gains that controls the speed of convergence of states to the optimal values that minimizes $f(x)$ and $g(x)$ respectively. (r) is a saturation function defined as:

$$\sigma_\psi(r) = \begin{cases} \text{sgn}(r) \cdot |r| & r < \psi \\ \text{sgn}(r) \cdot \psi & r > \psi \end{cases} \quad (29)$$

The closed loop dynamics of the multi-agent system (6) with control protocol (27) is represented as:

$$\dot{x}_a = \sigma_\psi(-z_a + \alpha_1 \mathcal{L}_{11} x_a + \beta_1 \mathcal{L}_{12} x_b - \gamma_1 \nabla F(x_a)) \quad (30)$$

$$\dot{x}_b = \sigma_\psi(-z_b + \alpha_2 \mathcal{L}_{22} x_b + \beta_2 \mathcal{L}_{21} x_a - \gamma_1 \nabla G(x_b)) \quad (31)$$

$$\dot{z}_a = \alpha_1 \beta_1 \mathcal{L}_{11} x_a \quad (32)$$

$$\dot{z}_b = \alpha_2 \beta_2 \mathcal{L}_{22} x_b \quad (33)$$

The multiagent system described by the first-order dynamics (6) achieves a stable optimal group consensus under control protocol (27) at $x^0 = x^*$ that satisfies the optimality conditions (5).

This can be shown in two stages. First, it can be shown that the equilibrium point x0 a and x0b are minima of the group objective functions $f(x_a)$ and $g(x_b)$ and therefore satisfies optimality conditions (5). Then it can be established that the equilibrium points x0 a and x0b are globally asymptotically stable.

At equilibrium, the set of equations (30)-(33) reduces to:

$$\sigma_\psi(-z_a - \alpha_1 \mathcal{L}_{11} x_a + \beta_1 \mathcal{L}_{12} x_b - \gamma_1 \gamma F(x_a)) = 0 \quad (34)$$

$$\sigma_\psi(-z_b - \alpha_2 \mathcal{L}_{22} x_b + \beta_2 \mathcal{L}_{21} x_a - \gamma_1 \nabla G(x_b)) = 0 \quad (35)$$

$$\alpha_1 \beta_2 \mathcal{L}_{11} x_a = 0 \quad (36)$$

$$\alpha_2 \beta_2 \mathcal{L}_{22} x_b = 0 \quad (37)$$

Left multiplying (32) and (32) by $1_n^T$ and $1_m^T$ respectively, yields $$1_n^T \dot{z}_a = \alpha_1 \beta_1 1_n^T \mathcal{L}_{11} x_a$$

$$1_m^T \dot{z}_b = \alpha_2 \beta_2 1_m^T \mathcal{L}_{22} x_b$$

Using Lemma 2 produces, $$\sum_{i=1}^{n} \dot{z}_a = 0$$

$$\sum_{i=n+1}^{n+m} \dot{z}_b = 0$$

which in turn implies that, $$\sum_{i=1}^{n} z_i = 0 \tag{38}$$

$$\sum_{i=n+1}^{n+m} z_i = 0 \tag{39}$$

From (34) and (35), the following are produced:

$$-z_a^0 - \beta_1 \mathcal{L}_{12} x_b^0 - \gamma_1 \nabla F(x_a^0) = 0 \tag{40}$$

$$-z_b^0 + \beta_2 \mathcal{L}_{21} x_a^0 - \gamma_2 \nabla G(x_b^0) = 0 \tag{41}$$

Applying Lemma 2 and left multiplying (40) and (41) by $1_n^T$ and $1_m^T$ respectively, it can be verified that the optimality condition in (5). Stability of the equilibrium point x0a and x0b can be shown. Consider the Lyapunov function $$V(x) = \Xi_a(s) + \Xi_b(s) + \frac{1}{2}\alpha_1\beta_1 x_a^T \mathcal{L}_{11} x_a + \frac{1}{2}\alpha_2\beta_2 x_b^T \mathcal{L}_{22} x_b \tag{42}$$

where $\Xi_a(s_a) = \int_0^{s_a} \sigma_{a,\psi}$ and $\Xi_b(s_b) = \int_0^{s_b} \sigma_{b,\psi}$. $s_a = -z_a - \alpha_1 \mathcal{L}_{11} x_a + \beta_1 \mathcal{L}_{12} x_b - \gamma_1 \nabla F(x_a)$ and $s_b \times -z_b - \alpha_2 \mathcal{L}_{22} x_b + \beta_2 \mathcal{L}_{21} x_a - \gamma_2 \nabla G(x_b)$. The time derivative of the Lyapunov function along the trajectories of the closed loop system is:

$$\dot{V} = -\sigma_{a,\psi}^T \dot{z}_a - \gamma_1 \sigma_{a,\psi}^T \nabla^2 F(x_a) \sigma_{a,\psi} - \alpha_1 \sigma_{a,\psi}^T \mathcal{L}_{11} \dot{x}_a +$$
$$\beta_1 \sigma_{a,\psi}^T \mathcal{L}_{12} \dot{x}_b + \alpha_1 \beta_1 x_a^T \mathcal{L}_{11} \dot{x}_a - \sigma_{b,\psi}^T \dot{z}_b - \gamma_2 \sigma_{b,\psi}^T \nabla^2 G(x_b) \sigma_{b,\psi} -$$
$$\alpha_2 \sigma_{b,\psi}^T \mathcal{L}_{22} \dot{x}_a + \beta_2 \sigma_{b,\psi}^T \mathcal{L}_{21} \dot{x}_a + \alpha_2 \beta_2 x_b^T \mathcal{L}_{22} \dot{x}_b$$

Rearranging, produces $$\dot{V} = -\gamma_1 \sigma_{a,\psi}^T \nabla^2 F(x_a) \sigma_{a,\psi} - \gamma_2 \sigma_{b,\psi}^T \nabla^2 G(x_b) \sigma_{b,\psi} -$$
$$\alpha_1 \sigma_{a,\psi}^T \mathcal{L}_{11} \sigma_{w,a} - \alpha_2 \sigma_{b,\psi}^T \mathcal{L}_{22} \sigma_{w,a} + \beta_2 \sigma_{b,\psi}^T \mathcal{L}_{21} \sigma_{a,\psi} + \beta_1 \sigma_{a,\psi}^T \mathcal{L}_{12} \sigma_{b,\psi}$$

A manifold S is defined as follows $$S = \{(x,v) : \dot{V} = 0 | \Lambda_3 = 0, \Lambda_4 = 0\} \tag{43}$$

where $\Lambda_3 = -z_a - \alpha_1 \mathcal{L}_{11} x_a + \beta_1 \mathcal{L}_{12} x_b - \gamma_1 \nabla F(x_a)$ $\Lambda_4 \times -z_b - \alpha_2 \mathcal{L}_{22} x_b + \beta_2 \mathcal{L}_{21} x_a - \gamma_2 \nabla G(x_b)$. If $x_a^0$ and $x_b^0$ are equilibrium points of $x_a$ and $x_b$ respectively, then it is possible to write $$-z_a^0 - \alpha_1 \mathcal{L}_{11} x_a^0 + \beta_1 \mathcal{L}_{12} x_b^0 - \gamma_1 \nabla F(x_a) = 0 \tag{44}$$

$$-z_b^0 - \alpha_2 \mathcal{L}_{22} x_b^0 + \beta_2 \mathcal{L}_{21} x_a^0 - \gamma_2 \nabla G(x_b^0) = 0 \tag{45}$$

Left multiplying (44) and (45) by $I_n$ and $I_m$ respectively and substituting (38), arrives at the optimality condition (5). The optimality condition (5) is satisfied at globally asymptotically stable equilibrium point.

Double Integrator Dynamics without Input Saturation A multiagent system can be described by the following double integrator dynamics:

$$\dot{x}_i = v_i$$

$$\dot{v}_i = u_i \tag{46}$$

For example, an optimal consensus protocol can be of the form:

$$u_i(t) = \begin{cases} -z_i - \gamma_1 \nabla f_i(x) - \eta_1 \nabla^2 f_i(x) v_1 \\ +\alpha_1 \sum_{\substack{j=1 \\ j \neq i}}^{n} a_{ij}[(x_j(t) - x_i(t)) + (v_j(t) - v_i(t))] \\ +\beta_1 \sum_{\substack{j=n+1 \\ j \neq i}}^{n=m} a_{ij}[x_j(t) + v_j(t)] \forall i \in \mathcal{G}_1 \\ -z_i - \gamma_2 \nabla g_i(x) - \eta_2 \nabla^2 g_i(x) v_1 + \\ \alpha_2 \sum_{\substack{j=n+1 \\ j \neq i}}^{n+m} a_{ij}[(x_j(t) - x_i(t)) + (v_j(t) - v_i(t))] \\ +\beta_2 \sum_{\substack{j=1 \\ j \neq i}}^{n} a_{ij}[x_j(t) + v(t)] \forall i \in \mathcal{G}_2 \end{cases} \tag{47}$$

$$\dot{z}_i(t) = \begin{cases} \alpha_1 \beta_1 \sum_{\substack{j=1 \\ j \neq i}}^{n} a_{ij}[(x_j(t) - x_i(t)) \\ +(v_j(t) - v_i(t))] \forall i \in \mathcal{G}_1 \\ \alpha_2 \beta_2 \sum_{\substack{j=1 \\ j \neq i}}^{n+m} a_{ij}[(x_j(t) - x_i(t)) \\ +(v_j(t) - v_i(t))] \forall i \in \mathcal{G}_2 \end{cases} \tag{48}$$

where 1 and 2 are positive intra-group coupling gains, 1 and 2 are positive inter-group coupling gains. 1, 2, 1, 2 are positive gains that controls the speed of convergence of states to the optimal values that minimizes $f(x)$ and $g(x)$ respectively.

The closed loop dynamics of (46) under protocol (47) is:

$$\dot{x}_a = v_a \tag{49}$$

$$\dot{x}_b = v_b \tag{50}$$

$$\dot{v}_a = -z_a - \gamma_1 \nabla f(x_a) - \eta_1 \nabla^2 f(x_a) v_a - \alpha_1 \mathcal{L}_{11}(x_a + v_a) - \beta_1 \mathcal{L}_{12}(x_b + v_b) \tag{51}$$

$$\dot{v}_b = -z_b - \gamma_2 \nabla g(x_b) - \eta_2 \nabla^2 g(x_b) v_b - \alpha_2 \mathcal{L}_{22}(x_b + v_b) - \beta_2 \mathcal{L}_{21}(x_a + v_a) \tag{52}$$

-continued $$\dot{z}_a = \alpha_1\beta_1 \mathcal{L}_{11}(x_a + v_a) \quad (53)$$

$$\dot{z}_b = \alpha_2\beta_2 \mathcal{L}_{22}(x_b + v_b) \quad (54)$$

The multiagent system described by the double integrator dynamics (46) achieves a stable optimal group consensus under control protocol (47) at $x^0 = x^*$ satisfying optimality condition (5).

Similar to above-mentioned approaches, the description below shows the system (46) achieves consensus at equilibrium point, x0 a, x0b that minimizes the group objective functions $f(x_a)$ and $g(x_a)$. The global asymptotic stability of the equilibrium point using Lyapunov function is described below.

The equilibrium points $x_a^0$, $x_b^0$, $v_a^0$, $v_b^0$, $z_a^0$, $z_b^0$ satisfy the following equations:

$$0 = v_a \quad (55)$$

$$0 = v_b \quad (56)$$

$$0 = \quad (57)$$
$$-z_a - \gamma_1 \nabla F(x_a) - \eta_1 \nabla^2 F(x_a)v_a - \alpha_1 \mathcal{L}_{11}(x_a + v_a) - \beta_1 \mathcal{L}_{12}(x_b + v_b)$$

$$0 = \quad (58)$$
$$-z_b - \gamma_2 \nabla G(x_b) - \eta_2 \nabla^2 G(x_b)v_b - \alpha_2 \mathcal{L}_{22}(x_b + v_b) - \beta_2 \mathcal{L}_{21}(x_a + v_a)$$

$$0 = \alpha_1\beta_1 \mathcal{L}_{11}(x_a + v_a) \quad (59)$$

$$0 = \alpha_2\beta_2 \mathcal{L}_{22}(x_b + v_b) \quad (60)$$

From which follows $$-z_a - \gamma_1 \nabla F(x_a) - \alpha_1 \mathcal{L}_{11}x_a - \beta_1 \mathcal{L}_{12}x_b = 0 \quad (61)$$

$$-z_b - \gamma_2 \nabla G(x_b) - \alpha_2 \mathcal{L}_{22}x_b - \beta_1 \mathcal{L}_{21}x_b = 0 \quad (62)$$

Left multiplying (53) and (54) by $1_n^T$ and $1_m^T$ respectively, $$1_n^T \dot{z}_a = \alpha_1\beta_1 1_n^T \mathcal{L}_{11}(x_a + v_a)$$

$$1_m^T \dot{z}_b = \alpha_2\beta_2 1_m^T \mathcal{L}_{22}(x_b + v_b)$$

Applying Lemma 2, results in:

$$\sum_{i=1}^{n} \dot{z}_i = 0$$

$$\sum_{i=n+1}^{n+m} \dot{z}_i = 0$$

Therefore, $$\sum_{i=1}^{n} \dot{z}_i = 0 \quad (63)$$

$$\sum_{i=n+1}^{n+m} \dot{z}_i = 0 \quad (64)$$

Multiplying (61) and (62) by $1_n^T$ and $1_m^T$ respectively, yields $$-1_n^T z_a - \gamma_1 1_n^T \nabla F(x_a) - \alpha_1 1_n^T \mathcal{L}_{11}x_a - \beta_1 1_n^T \mathcal{L}_{12}x_b = 0$$

$$-1_m^T z_b - \gamma_2 1_m^T \nabla G(x_b) - \alpha_2 1_m^T \mathcal{L}_{22}x_b - \beta_2 1_m^T \mathcal{L}_{21}x_b = 0$$

Applying Lemma 2, shows that $$-\sum_{i=1}^{n} z_a = \gamma_1 \sum_{i=1}^{n} \nabla F(x_a) = 0 \quad (65)$$

$$-\sum_{i=n+1}^{n+m} z_b = \gamma_2 \sum_{i=n+1}^{n+m} \nabla G(x_b) = 0 \quad (66)$$

Substituting (63) and (64) in (65) and (66) respectively, shows that the optimality condition (5) is verified. Next to prove the stability of the equilibrium point, consider the following Lyapunov function:

$$V(x,v) = \alpha_1 \frac{1}{2} x_a \mathcal{L}_{11} x_a + \alpha_2 \frac{1}{2} x_b \mathcal{L}_{22} x_b + \frac{1}{2} v_a^T v_a + \frac{1}{2} v_b^T v_b \quad (67)$$

The time derivative of the Lyapunov function along the trajectories of the closed loop system yields, $$\dot{V}(x,v) = v_a^T(-z_a - \gamma_1 \nabla F(z_a) - \quad (68)$$
$$\eta_1 \nabla^2 F(x_a)v_a - \alpha_1 \mathcal{L}_{11}(x_a + v_a) + \beta_1 \mathcal{L}_{12}(x_b + v_b)) +$$
$$v_b^T(-z_b - \gamma_2 \nabla G(x_b) - \eta_2 \nabla^2 G(x_b)v_b - \alpha_2 \mathcal{L}_{22}(x_b + v_b) +$$
$$\beta_2 \mathcal{L}_{21}(x_a + v_a)) + \alpha_1 v_a^T \mathcal{L}_{11} x_a + \alpha_2 v_b^T \mathcal{L}_{22} x_b$$

Expanding and rearranging yields, $$\dot{V}(x,v) = -\alpha_1 v_a^T \mathcal{L}_{11} v_a - \alpha_2 v_b^T \mathcal{L}_{22} v_b - \eta_1 v_a^T \nabla^2 F(x_a)v_a - \eta_2 v_b^T \nabla^2 G(x_b)v_b -$$
$$v_a^T(z_a + \gamma_1 \nabla F(x_a) + \eta_1 \nabla^2 F(x_a)v_a + \beta_1 \mathcal{L}_{12} x_b + \beta_1 \mathcal{L}_{12} v_b) -$$
$$v_b^T(z_b + \gamma_2 \nabla G(x_b) + \eta_2 \nabla^2 G(x_b)v_b + \beta_2 \mathcal{L}_{21} x_a + \beta_2 \mathcal{L}_{21} v_a)$$

A manifold S is defined as follows:

$$S = \{(x,v): \dot{V} = 0 | \Lambda_5 = 0, \Lambda_6 = 0\} \quad (69)$$

Where where $\Lambda_5 = z_a + \gamma_1 \nabla F(x_a) + \eta_1 \nabla^2 F(x_a)v_a + \beta_1 \mathcal{L}_{12} x_b + \beta_1 \mathcal{L}_{12} v_b$ and $\Lambda_6 = z_b + \gamma_2 \nabla G(x_b) + \eta_2 \nabla^2 G(x_b)v_b + \beta_2 \mathcal{L}_{21} x_a + \beta_2 \mathcal{L}_{21} v_a$ If $x_a = x_a^0$, $x_a = x_b^0$, $v_a = v_a^0$, $v_b = v_b^0$, Which gives, $$z_a^0 + \gamma_1 \nabla F(x_a^0) = 0 \quad (70)$$

$$z_b^0 + \gamma_2 \nabla g(x_b^0) = 0 \quad (71)$$

Left multiplying both (70) and (71) by $1_n^T$ and $1_m^T$ respectively, shows the optimality condition (5) is satisfied. Hence, the agents achieve consensus at a globally asymptotically stable equilibrium point that minimizes the group objective function.

Double Integrator Dynamics with Input Saturation

Some implementations can include a group consensus protocol for the multiagent system (46) defined as follows:

$$u_i(t) = \begin{cases} \sigma_\psi(-z_i - \gamma_1 \nabla f_i(x) + & (72) \\ \alpha_1 \sum_{\substack{j=1 \\ j \neq i}}^{n} a_{ij}[(x_j(t) - x_i(t)) + (\upsilon_j(t) - \upsilon_i(t))] & \\ + \beta_1 \sum_{\substack{j=n+1 \\ j \neq i}}^{n+m} a_{ij}[x_j(t) + \upsilon_j(t)]) \forall i \in \mathcal{G}_1 & \\ \sigma_\psi(-z_i - \gamma_2 \nabla g_i(x) + & \\ \alpha_2 \sum_{\substack{j=n+1 \\ j \neq i}}^{n+m} a_{ij}[(x_j(t) - x_i(t)) + (\upsilon_j(t) - \upsilon_i(t))] + & \\ \beta_2 \sum_{\substack{j=1 \\ j \neq i}}^{n} a_{ij}[x_j(t) + \upsilon_j(t)]) \forall i \in \mathcal{G}_2 & \end{cases}$$

$$\dot{z}_i(t) = \begin{cases} \alpha_1 \beta_1 \sum_{\substack{j=1 \\ j \neq i}}^{n} a_{ij}[(x_j(t) - x_i(t)) & (73) \\ +(\upsilon_j(t) - \upsilon_i(t))] \forall i \in \mathcal{G}_1 & \\ \alpha_2 \beta_2 \sum_{\substack{j=n+1 \\ j \neq i}}^{n+m} a_{ij}[(x_j(t) - x_i(t)) & \\ +(\upsilon_j(t) - \upsilon_i(t))] \forall i \in \mathcal{G}_2 & \end{cases}$$

where 1 and 2 are positive intra-group coupling gains, 1 and 2 are positive inter-group coupling gains. 1, 2, 1, 2 are positive gains that controls the speed of convergence of states to the optimal values that minimizes $f(x)$ and $g(x)$ respectively.

The closed loop dynamics of the multiagent system described by the dynamics (46) under protocol (72) is given by:

$$\dot{x}_a = \upsilon_a \tag{74}$$

$$\dot{x}_b = \upsilon_b \tag{75}$$

$$\dot{\upsilon}_a = \sigma_{a,\psi}(-z_a - \gamma_1 \nabla F(x_a) - \\ \eta_1 \nabla^2 F(x_a)\upsilon_a - \alpha_1 \mathcal{L}_{11}(x_a + \upsilon_a) - \beta_1 \mathcal{L}_{12}(x_b + \upsilon_b)) \tag{76}$$

$$\dot{\upsilon}_b = \sigma_{b,\psi}(-z_b - \gamma_2 \nabla G(x_b) - \\ \eta_2 \nabla^2 G(x_b)\upsilon_b - \alpha_2 \mathcal{L}_{22}(x_b + \upsilon_b) - \beta_2 \mathcal{L}_{21}(x_a + \upsilon_a)) \tag{77}$$

$$\dot{z}_a = \alpha_1 \beta_1 \mathcal{L}_{11}(x_a + \upsilon_a) \tag{78}$$

$$\dot{z}_b = \alpha_2 \beta_2 \mathcal{L}_{22}(x_b + \upsilon_b) \tag{79}$$

The multiagent system described by the double integrator dynamics (46) achieves a stable optimal group consensus under control protocol (47) at $x^0 = x^*$ satisfying optimality condition (5).

Following the usual approach with the previous cases, below is shown that the MAS with dynamics (46) reaches an equilibrium $x_a^0$ and $x_b^0$ that minimizes group objective function $f(x)$ and $g(x)$ respectively. It is easy to see that the equilibrium point $x_a^0$ and $x_b^0$ satisfy:

$$\sigma_{a,\psi}(-z_a^0 - \gamma_1 \nabla F(x_a^0) - \alpha_1 \mathcal{L}_{11} x_a^0 - \beta_1 \mathcal{L}_{12} x_b^0) = 0$$

$$\sigma_{b,\psi}(-z_b^0 - \gamma_2 \nabla G(x_b^0) - \alpha_2 \mathcal{L}_{22} x_b^0 - \beta_2 \mathcal{L}_{21} x_a^0) = 0 \tag{80}$$

The equilibrium points satisfy the optimality conditions following the same procedure as described above. The global asymptotic stability of the equilibrium points, can be shown with the following Lyapunov function, $$V(x) = \Xi_a(s) + \Xi_b(s) + \frac{1}{2}\alpha_1\beta_1 x_a^T \mathcal{L}_{11} x_a + \frac{1}{2}\alpha_2\beta_2 x_b^T \mathcal{L}_{22} x_b \tag{81}$$

where $\Xi_a(s) = \int_0^{s_a} \sigma_{s,\psi}$, $\Xi_b(s) = \int_0^{s_b} \sigma_{b,\psi}$, $s_a = -z_a - \gamma_1 \nabla F(x_a) - \eta_1 \nabla^2 F(x_a) \upsilon_a - \alpha_1 \mathcal{L}_{11}(x_a + \upsilon_a) + \beta_1 \mathcal{L}_{12}(x_b + \upsilon_b)$, $s_b = -z_b - \gamma_2 \nabla G(x_b) + \eta_2 \nabla^2 G(x_b)\upsilon_b - \alpha_2 \mathcal{L}_{22}(x_b + \upsilon_b) + \beta_2 \mathcal{L}_{21}(x_a + \upsilon_a)$. Taking the derivative of the Lyapunov function along the trajectories of the closed loop system, we get:

$$\dot{V} = -\eta_1 \sigma_{a,\psi} \nabla^2 F(x_a) \upsilon_a^2 - \eta_2 \sigma_{b,\psi} \nabla^2 G(x_b)\upsilon_b^2 \sigma_{a,\psi}^T \dot{z}_a - \\ \sigma_{b,\psi}^T \dot{z}_b + [-\gamma_1 \sigma_{a,\psi}^T \nabla F(x_a) - \alpha_1 \sigma_{a,\psi} \mathcal{L}_{11} + \beta_2 \sigma_{b,\psi} \mathcal{L}_{21} + \alpha_1 \beta_1 x_a^T \mathcal{L}_{11}] \\ \upsilon_a + [-\eta_1 \sigma_{a,\psi}^T \nabla^2 F(x_a) - \alpha_1 \sigma_{a,\psi}^T \mathcal{L}_{11} + \beta_2 \sigma_{b,\psi} \mathcal{L}_{21}] \\ \dot{\upsilon}_a [-\gamma_2 \sigma_{b,\psi}^T \nabla G(x_b) - \alpha_2 \sigma_{b,\psi} \mathcal{L}_{22} + \beta_1 \sigma_{a,\psi} \mathcal{L}_{11} + \alpha_2 \beta_2 x_b^T \mathcal{L}_{22}] \\ \upsilon_b + [-\eta_2 \sigma_{b,\psi}^T \nabla^2 G(x_b) - \alpha_2 \sigma_{b,\psi}^T \mathcal{L}_{22} + \beta_1 \sigma_{a,\psi} \mathcal{L}_{12}]\dot{\upsilon}_b$$

If $x_a^0$ and $x_b^0$, it is easy to verify that the $\dot{V}=0$ and thus the equilibrium point that minimizes the group objective function is asymptotically stable.

An example multi-agent system is show in FIG. 1 and includes 5 agents and 2 subgroups. (See, Y. Gao, J. Yu, J. Shao, and Y. Duan, "Group consensus for multiagent systems under the effect of coupling strength among groups," IFAC-Papers On Line, vol. 48, no. 28, mpp. 449-454, 2015, 17th IFAC Symposium on System Identification SYSID 2015, which is incorporated herein by reference). In subgroup 1, there are 3 agents and in subgroup two there are 2 agents. The Laplacian matrix representing the interconnections is defined as follows:

$$\mathcal{L} = \begin{bmatrix} 4 & -3 & -1 & 1 & -1 \\ -3 & 3 & 0 & -1 & 1 \\ -1 & 0 & 1 & 0 & 0 \\ 1 & -1 & 0 & 3 & -3 \\ -1 & 1 & 0 & -3 & 3 \end{bmatrix} \tag{82}$$

$$\mathcal{L}_{11} = \begin{bmatrix} 4 & -3 & -1 \\ -3 & 3 & 0 \\ -1 & 0 & 1 \end{bmatrix}, \tag{83}$$

$$\mathcal{L}_{22} = \begin{bmatrix} 3 & -3 \\ -3 & 3 \end{bmatrix}$$

$$\mathcal{L}_{12} = \begin{bmatrix} 1 & -1 \\ -1 & 1 \\ 0 & 0 \end{bmatrix} \tag{84}$$

The group objective functions for the subgroups are defined as follows:

$$f(x) = (x_1 - 5)^4 + (x_2 - 3)^2 + x_4^3 \tag{85}$$

$$g(x) = x_4^4 + 3x_5^4 \tag{86}$$

The group cost functions f(x) and g(x) satisfy Assumption 2.

First-Order Integrator Dynamics

Figure 6:
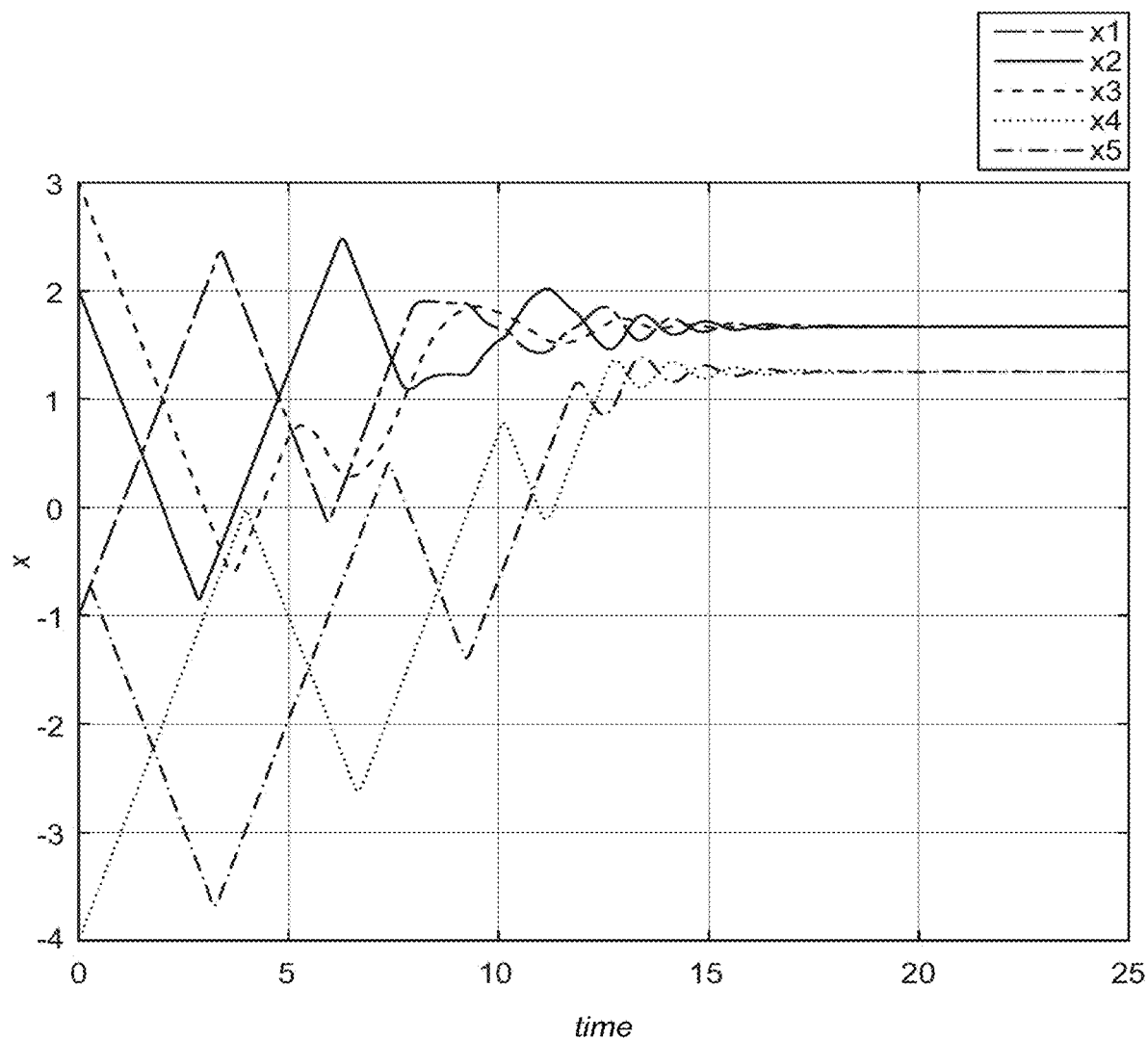
FIG. 6 is a graph showing states of an example single integrator multi-agent system with input saturation in accordance with some implementations.
Figure 7:
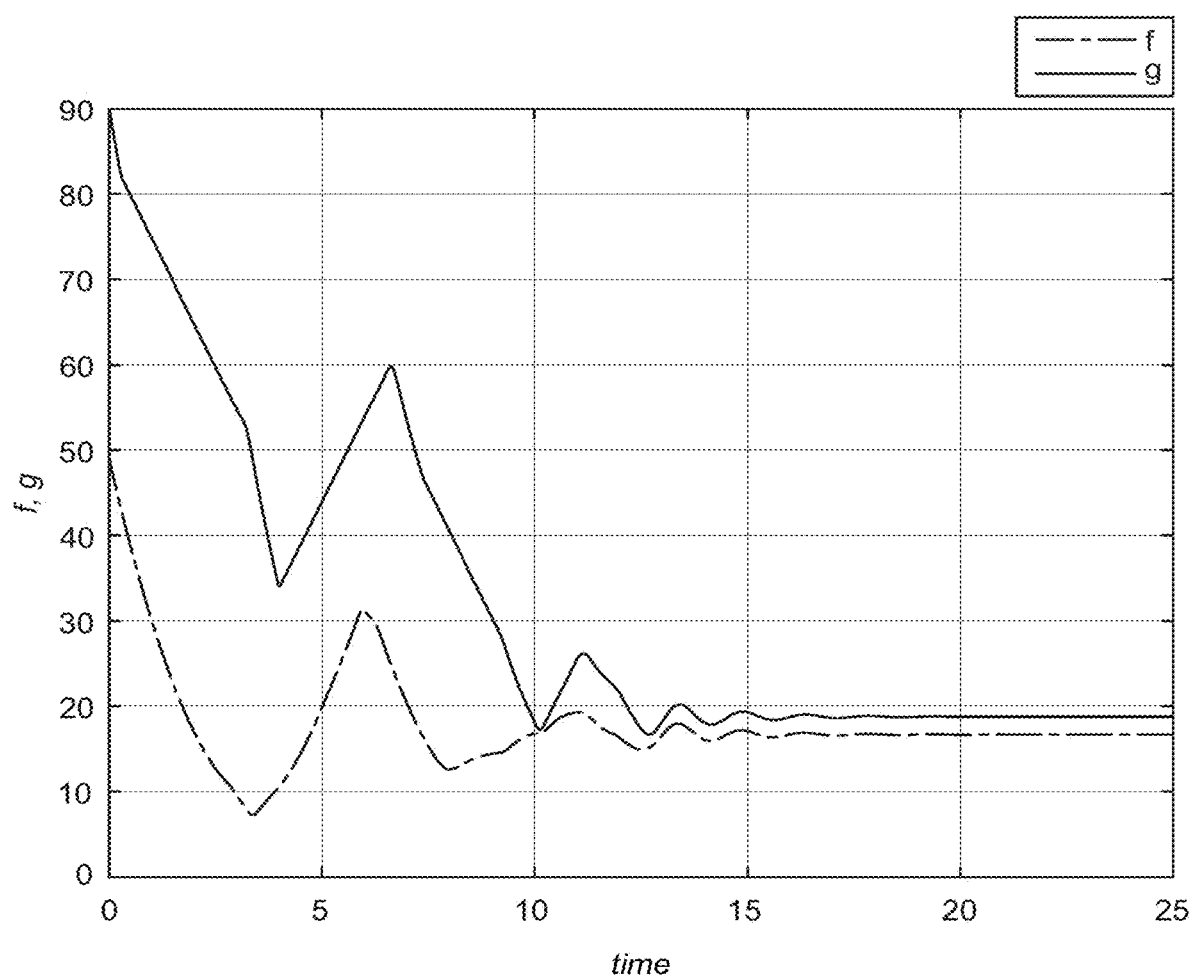
FIG. 7 is a graph showing group objective functions of an example single integrator multi-agent system with input saturation in accordance with some implementations.
Figure 8:
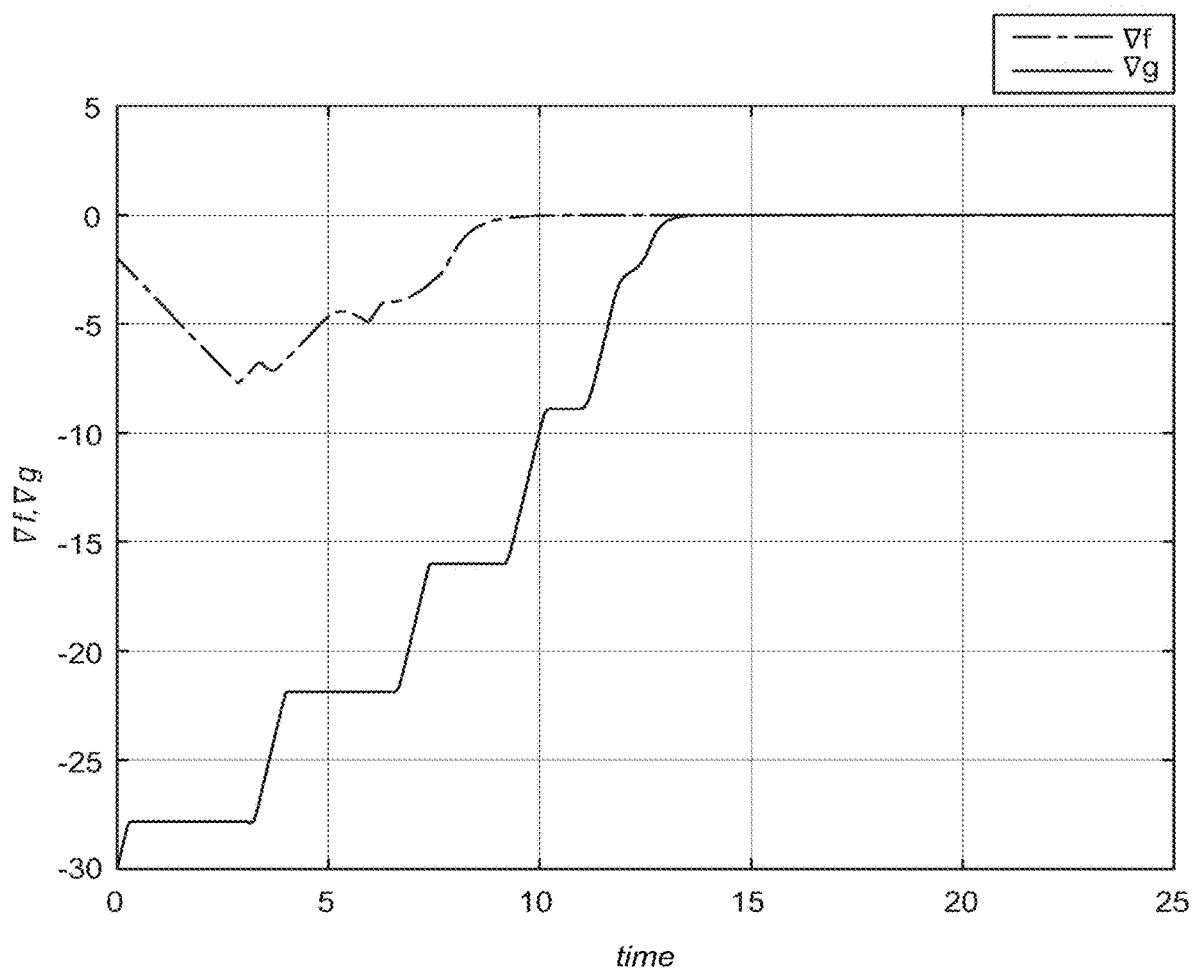
FIG. 8 is a graph showing a gradient of the group objective functions of an example single integrator multi-agent system with input saturation in accordance with some implementations.
Figure 9:
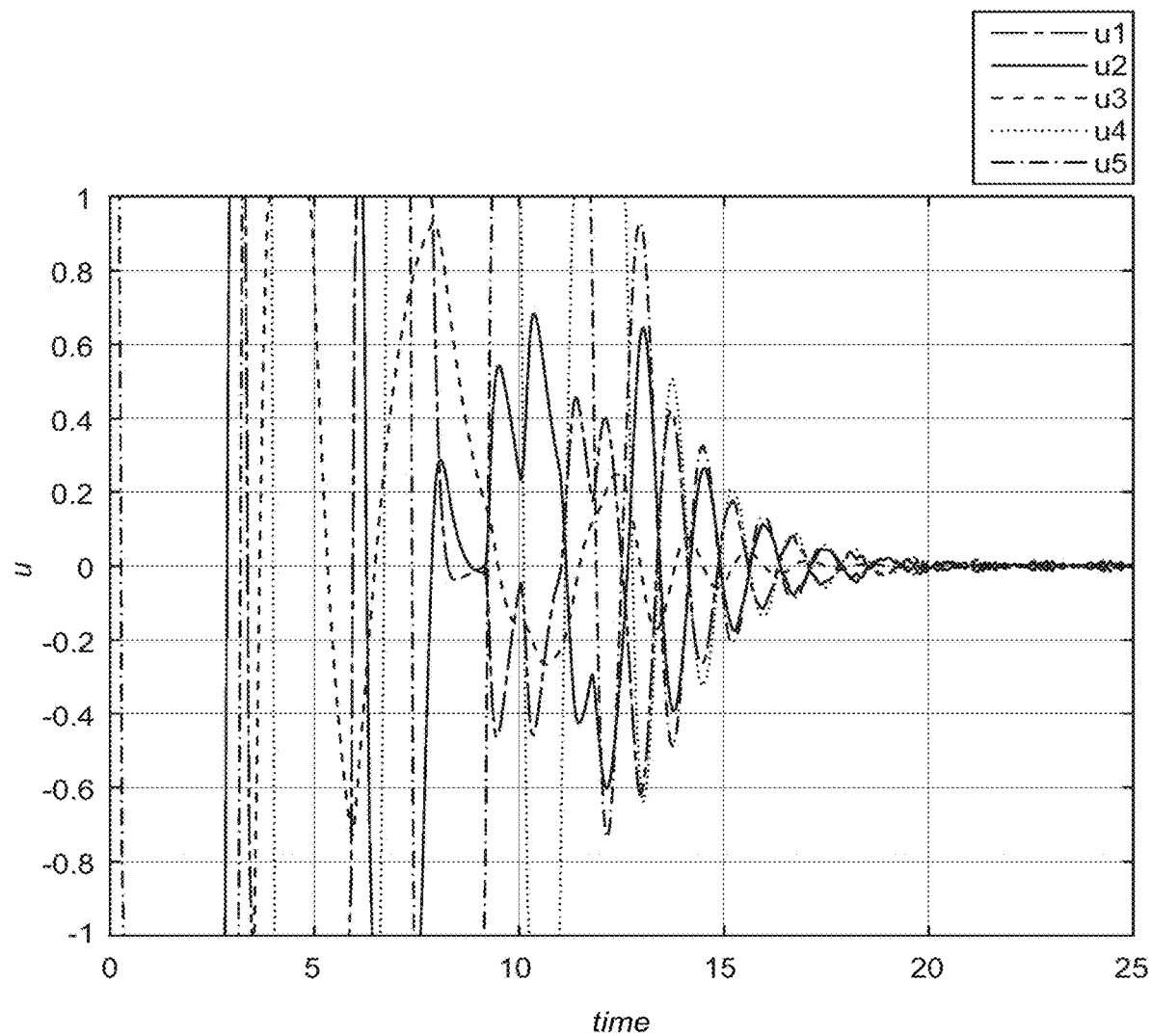
FIG. 9 is a graph showing control inputs to an example single integrator multi-agent system with input saturation in accordance with some implementations.
Figure 10:
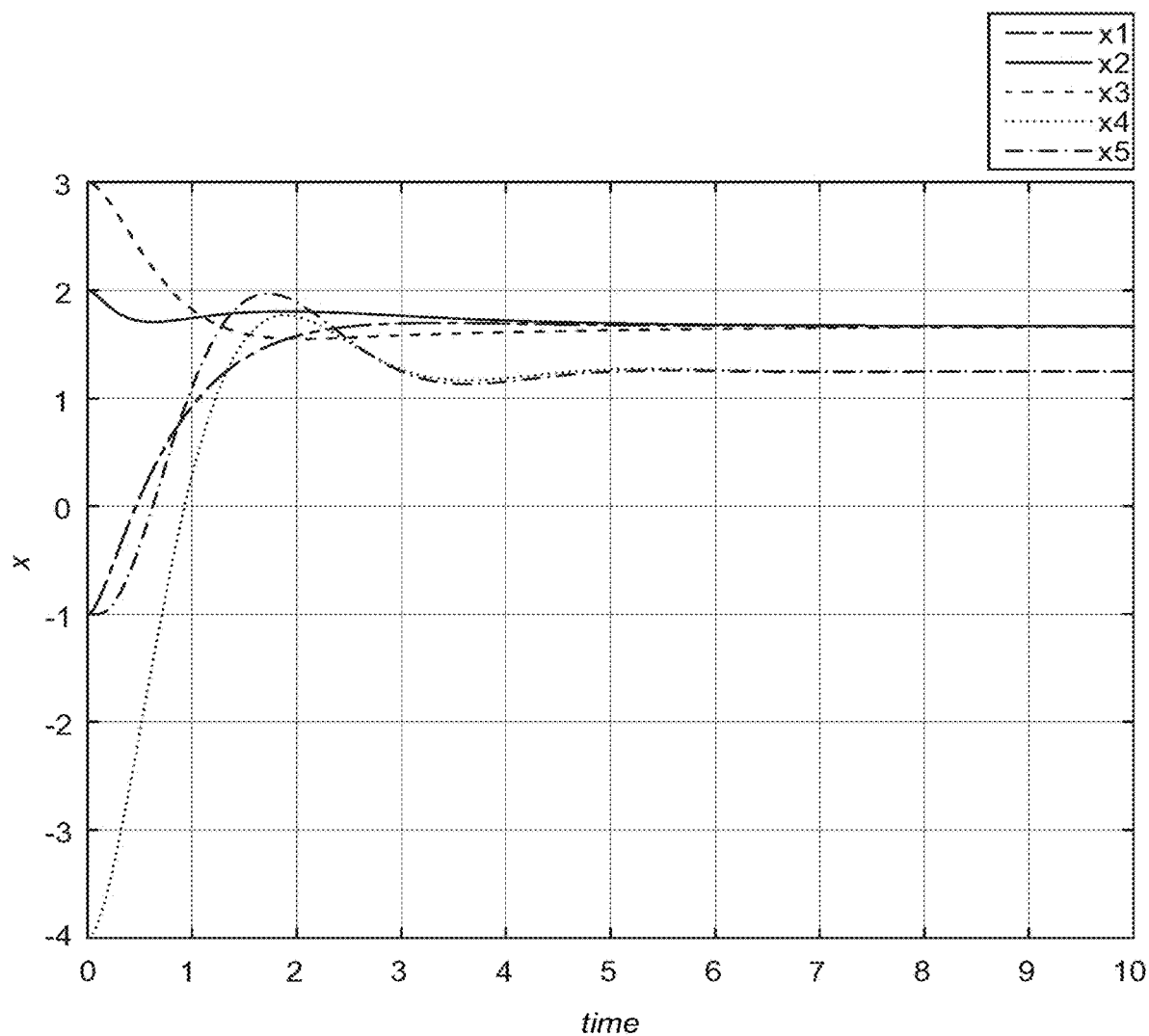
FIG. 10 is a graph showing position states of an example double integrator multi-agent system without input saturation in accordance with some implementations.
Figure 11:
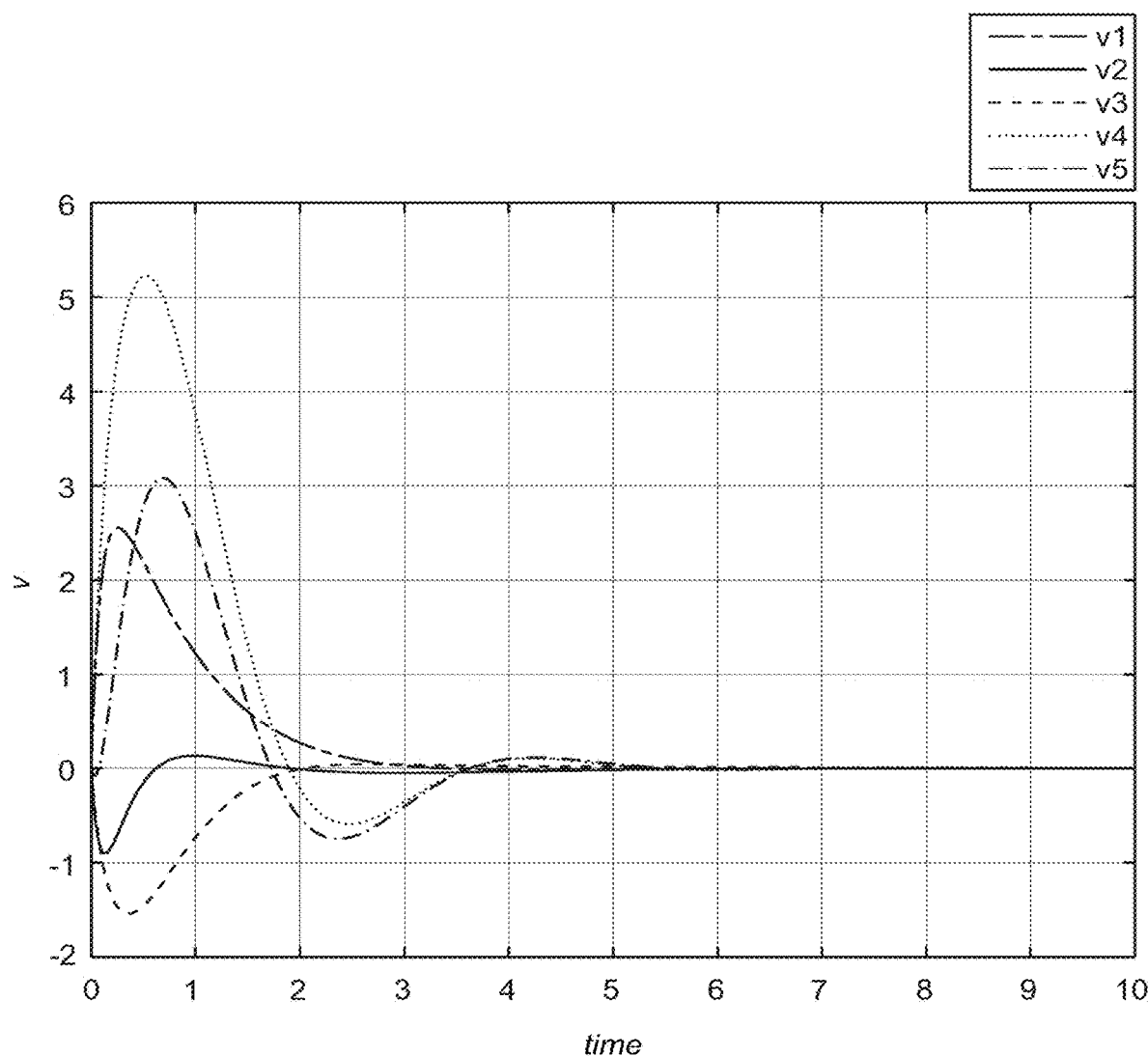
FIG. 11 is a graph showing velocity states of an example double integrator multi-agent system without input saturation in accordance with some implementations.
Figure 12:
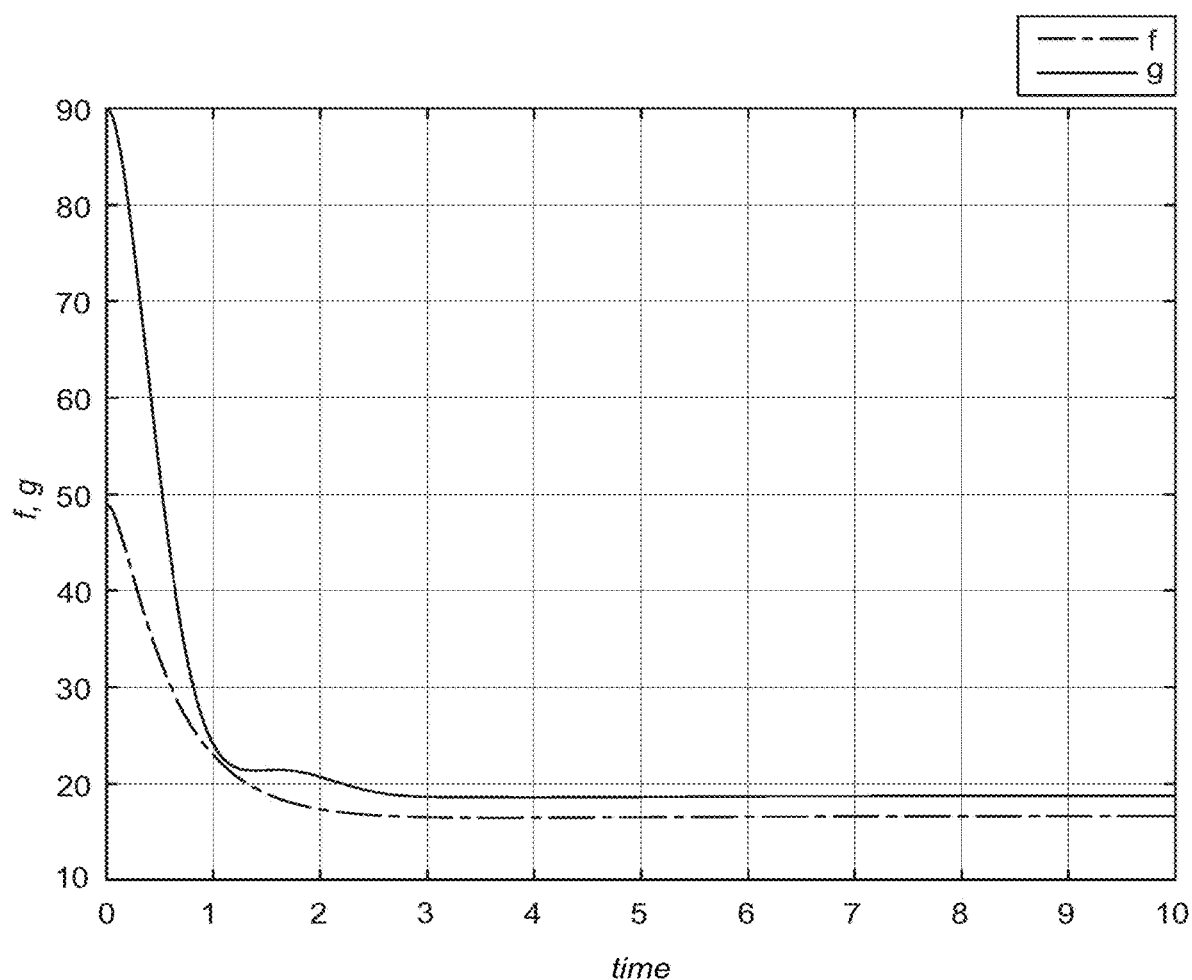
FIG. 12 is a graph showing group objective functions of an example double integrator multi-agent system without input saturation in accordance with some implementations.
Figure 13:
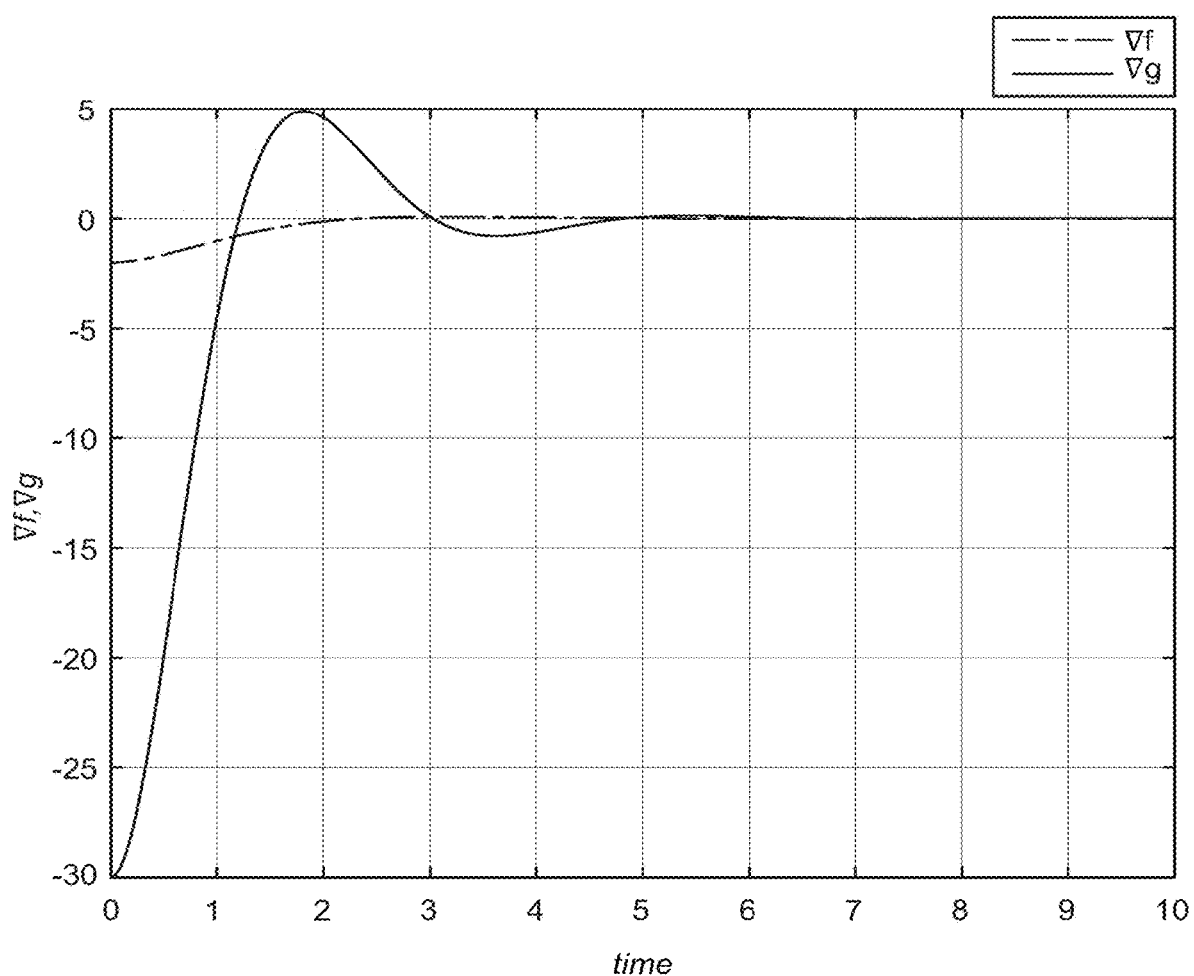
FIG. 13 is a graph showing a gradient of the group objective functions of an example double integrator multi-agent system without input saturation in accordance with some implementations.
Figure 14:
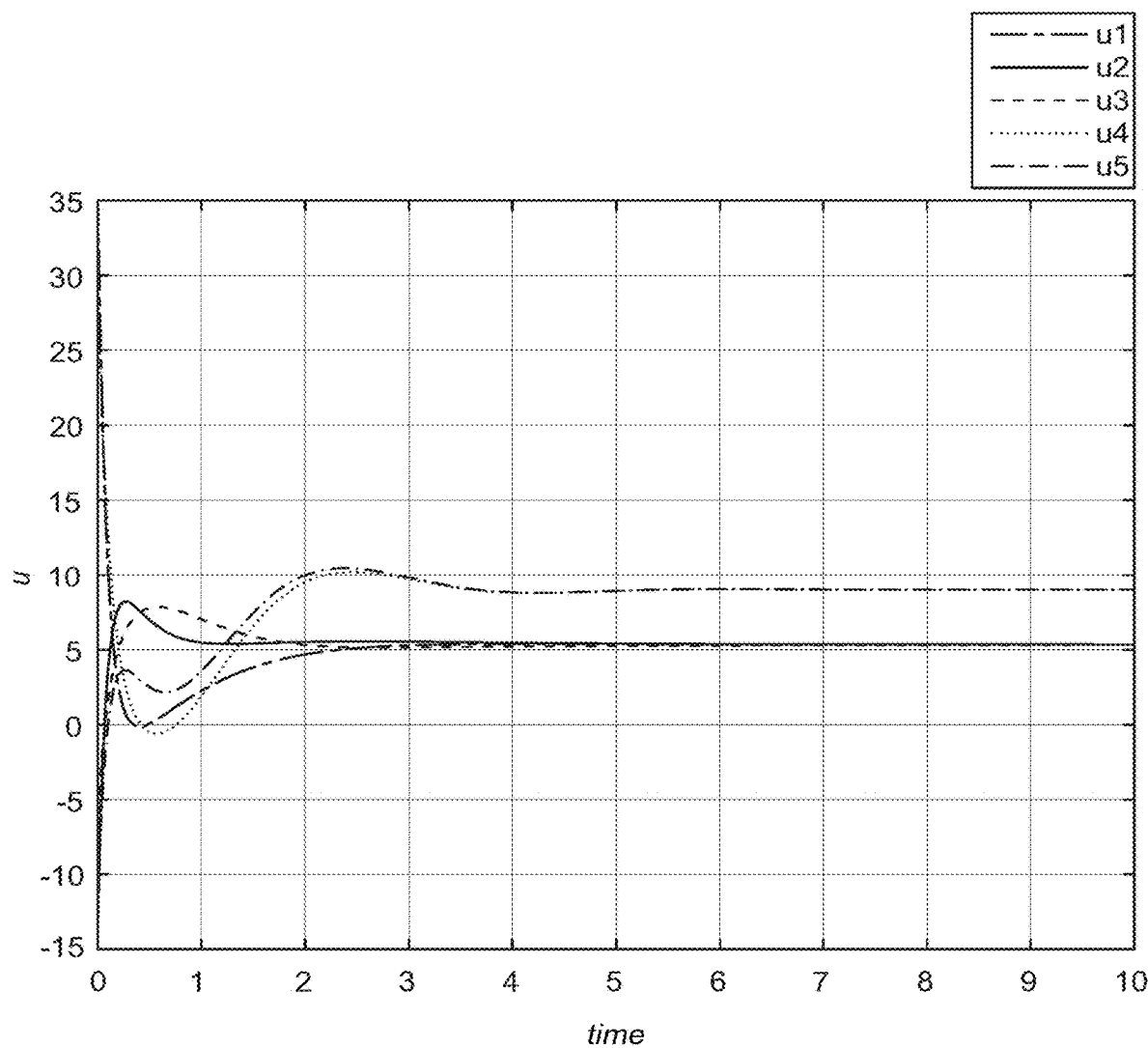
FIG. 14 is a graph showing control inputs of an example double integrator multi-agent system without input saturation in accordance with some implementations.

The case where the multi-agent network is represented by a group of agents with first-order dynamics was simulated. FIGS. 2-5 present the simulation plots for the case without input saturation under control protocol (7). The agents of the network approach group consensus at an optimal state minimizing the group objective functions, which can be verified via FIG. 4, which shows the evolution of the gradient of the group objective functions. The feasibility of (27) is demonstrated by assuming that the control input u for each agent is bounded as $|u| \leq 1$. As shown in FIG. 6, the multiagent network converged to an optimal group consensus state which can be verified from FIG. 8 while satisfying the control input constraint as shown in FIG. 9.

The feasibility of the second order control protocols was examined via simulation examples. FIGS. 10-14 show the system responses when there was no input saturation. The multiagent network achieves global optimal consensus at a terminal state that minimizes the group objective functions which can be verified from the evolution of the gradient of the group objective functions in FIG. 13. Assume that the control input is subject to some saturation constraints, that is, $|u| \leq 50$.

Figure 15:
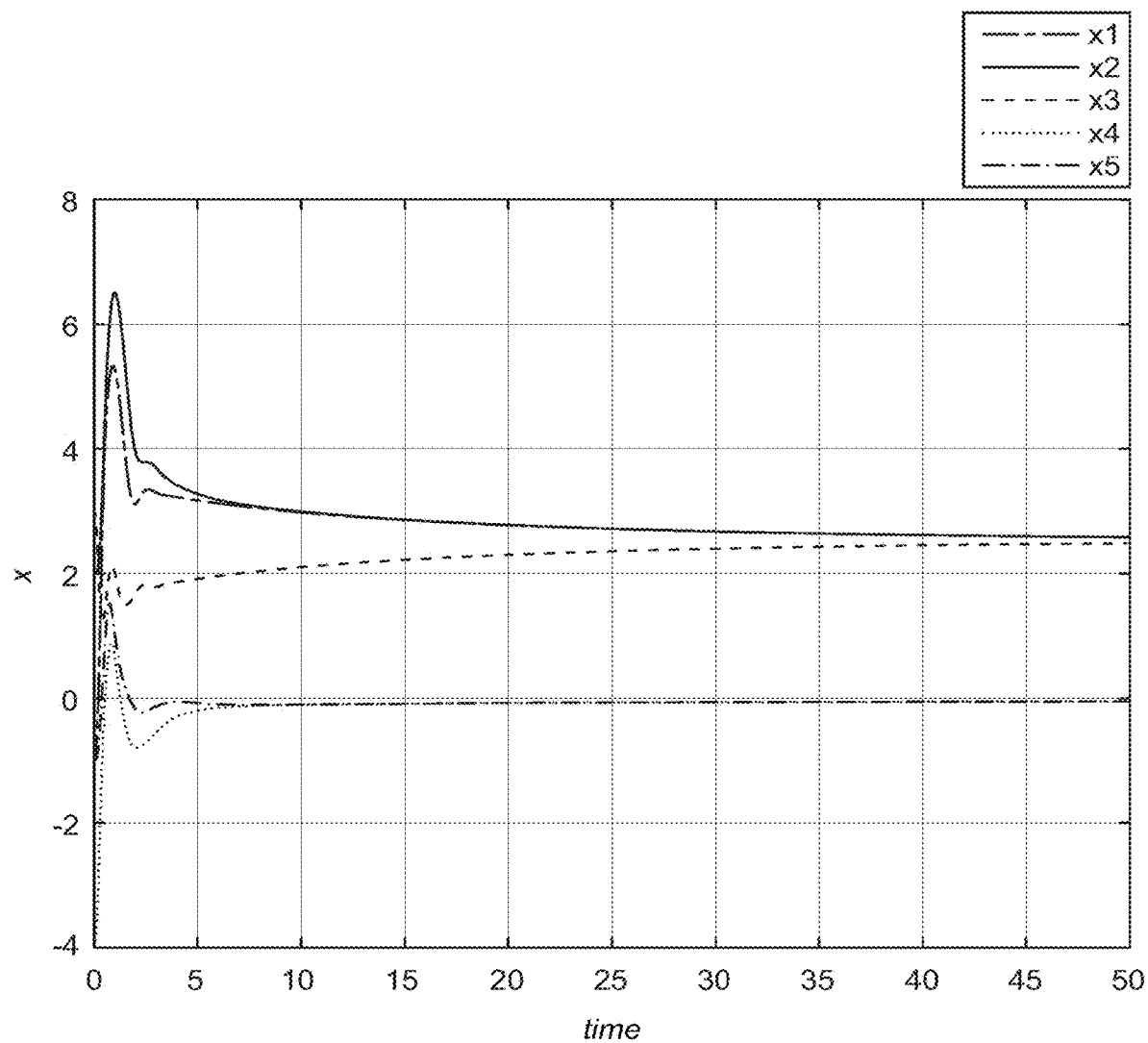
FIG. 15 is a graph showing position stated of an example double integrator multi-agent system with input saturation in accordance with some implementations.
Figure 16:
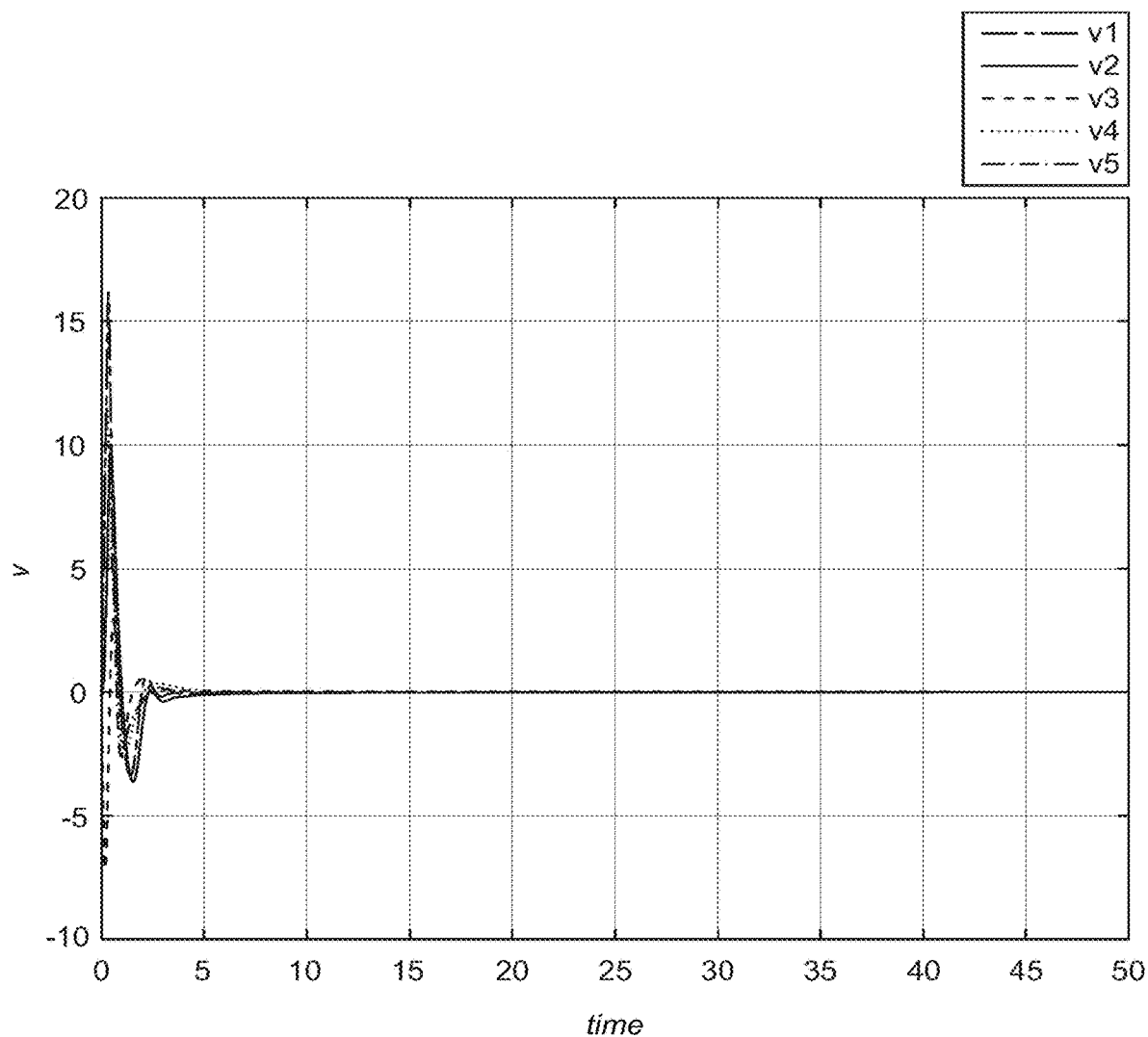
FIG. 16 is a graph showing velocity states of an example double integrator multi-agent system with input saturation in accordance with some implementations.
Figure 17:
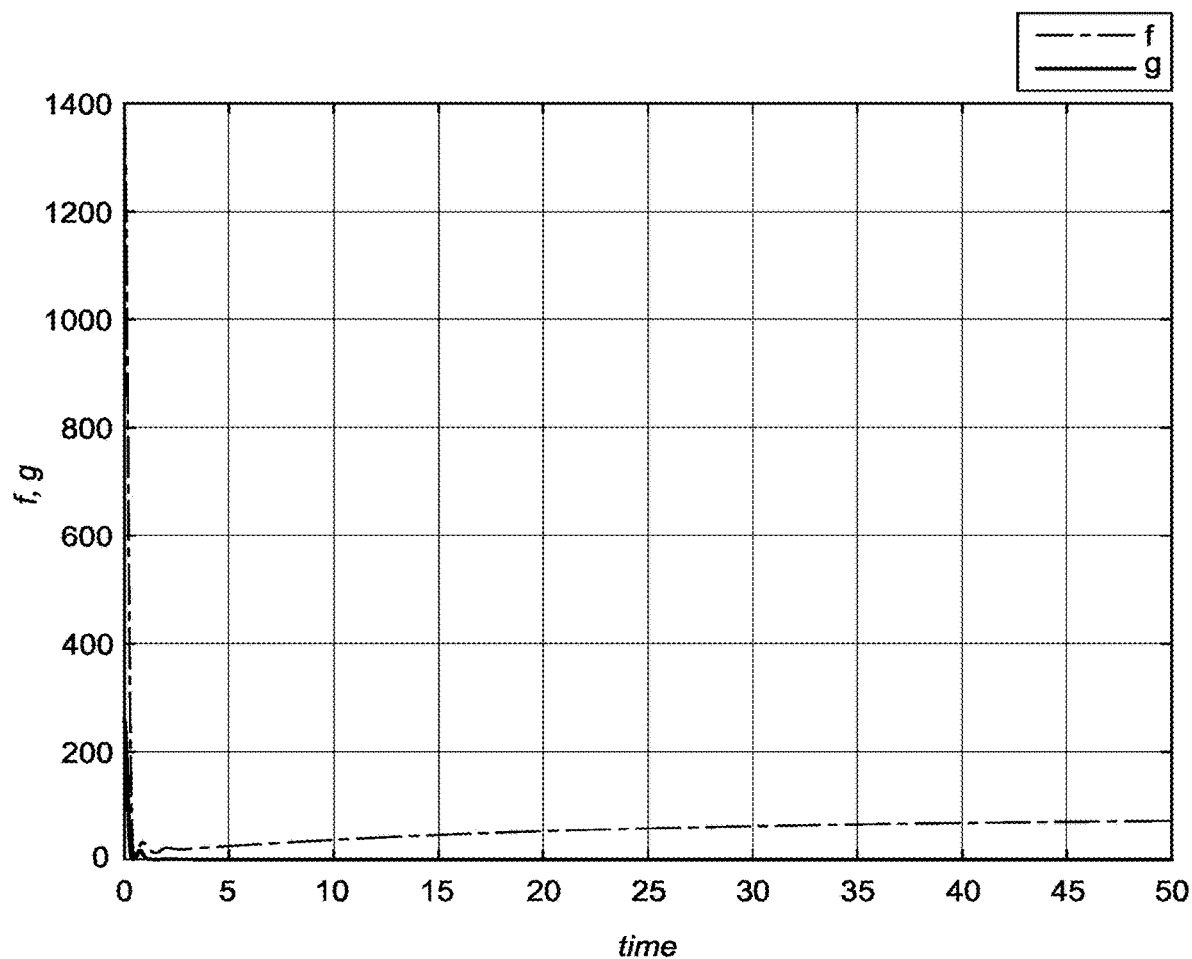
FIG. 17 is a graph showing group objective functions of an example double integrator multi-agent system with input saturation in accordance with some implementations.
Figure 18:
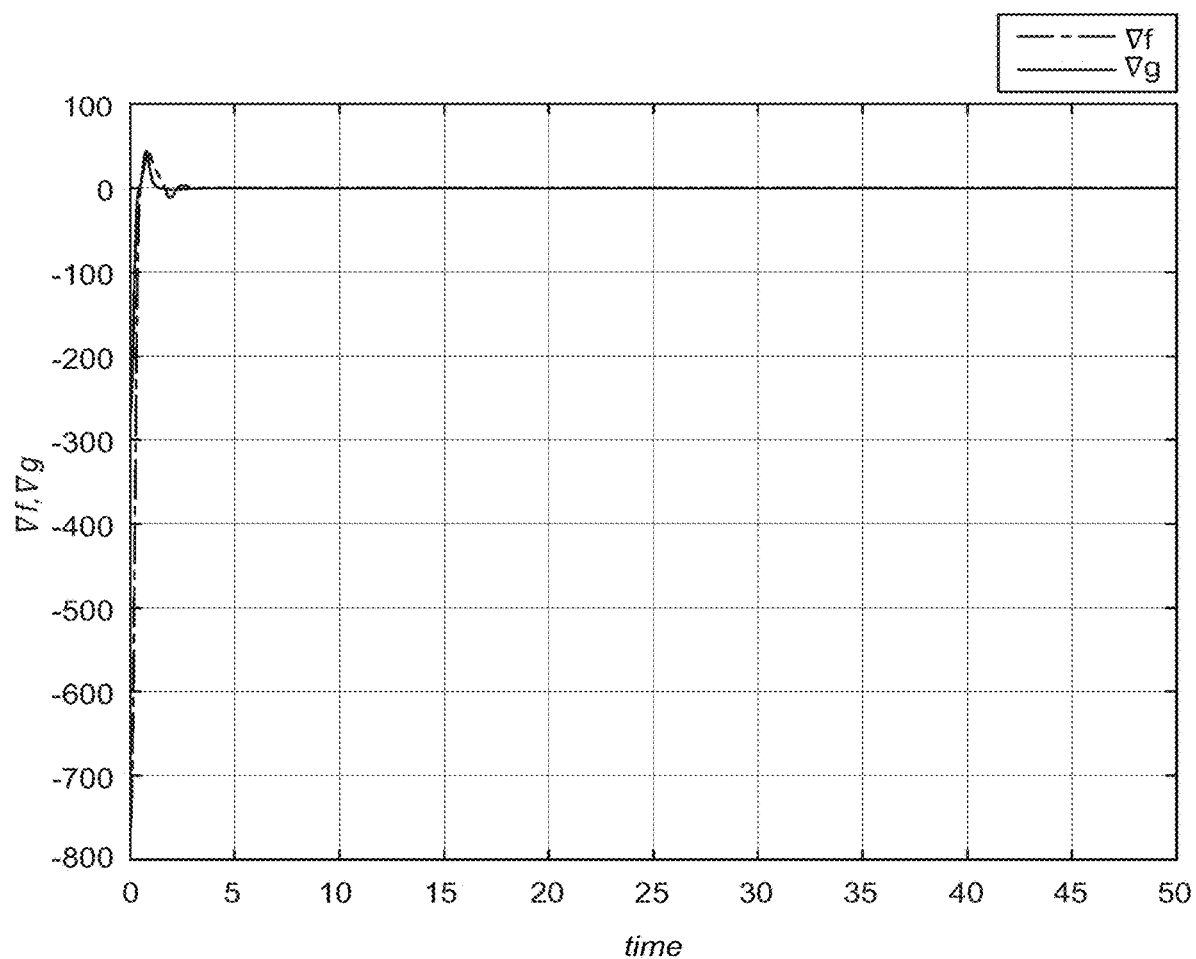
FIG. 18 is a graph showing a gradient of the group objective functions of an example double integrator multi-agent system with input saturation in accordance with some implementations.
Figure 19:
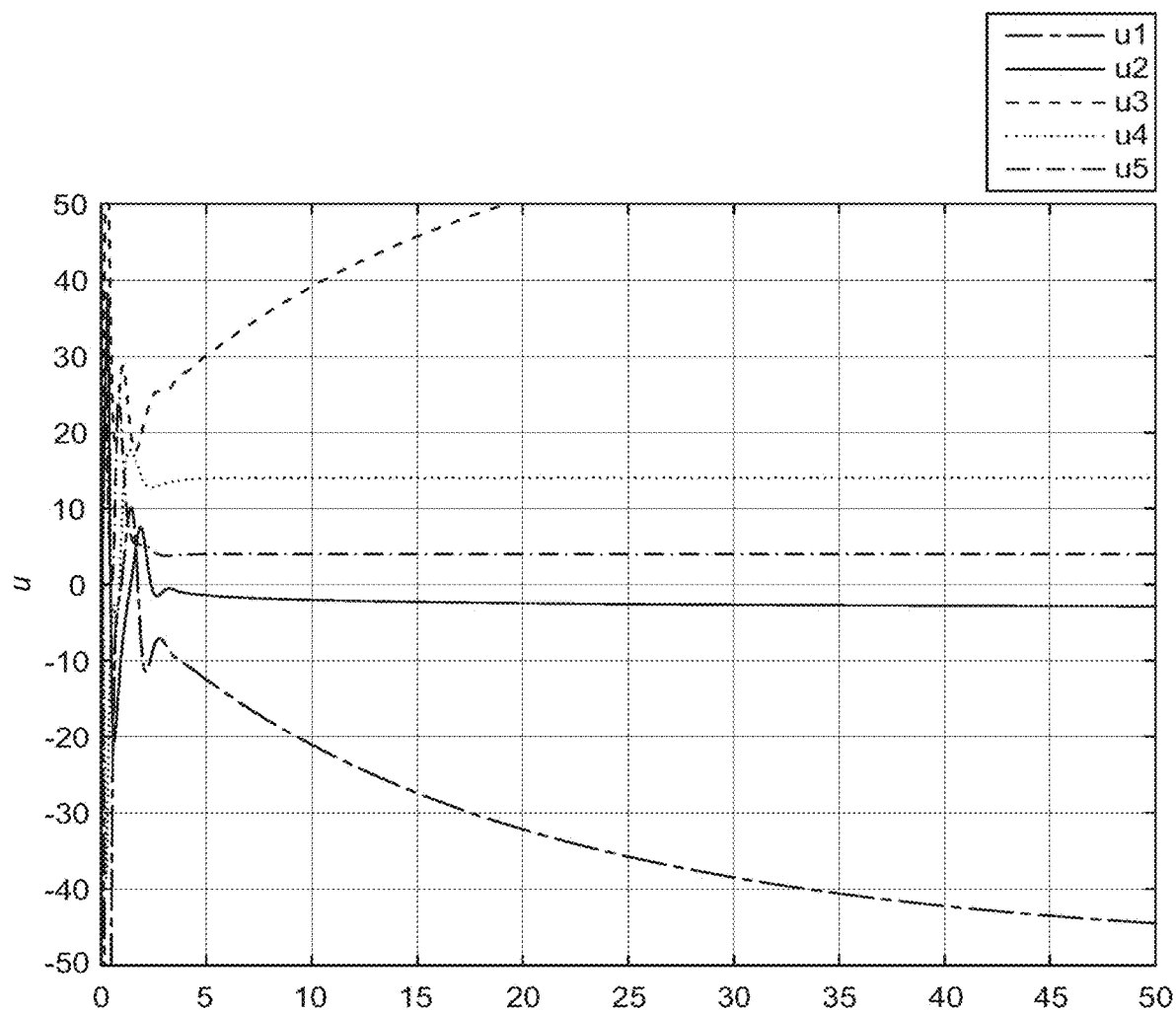
FIG. 19 is a graph showing control inputs of an example double integrator multi-agent system with input saturation in accordance with some implementations.

Again, it can be verified from FIG. 15, that the multiagent network achieves global optimal consensus at an optimal state that minimizes the group objective functions without violating the control constraints.

Some implementations can include methods and systems to provide an optimal solution to a group consensus problem for multiagent systems exhibiting first and second-order dynamics. For each class of multiagent systems, simulation shows the effectiveness for cases with and without input saturation. Some implementations can include group consensus protocols for each case that exhibit convergence to a consensus state that minimizes one or more group objective functions using Lyapunov theory. The effectiveness of the consensus protocols was demonstrated through simulations as discussed above using MATLAB-based simulation examples.

Figure 20:
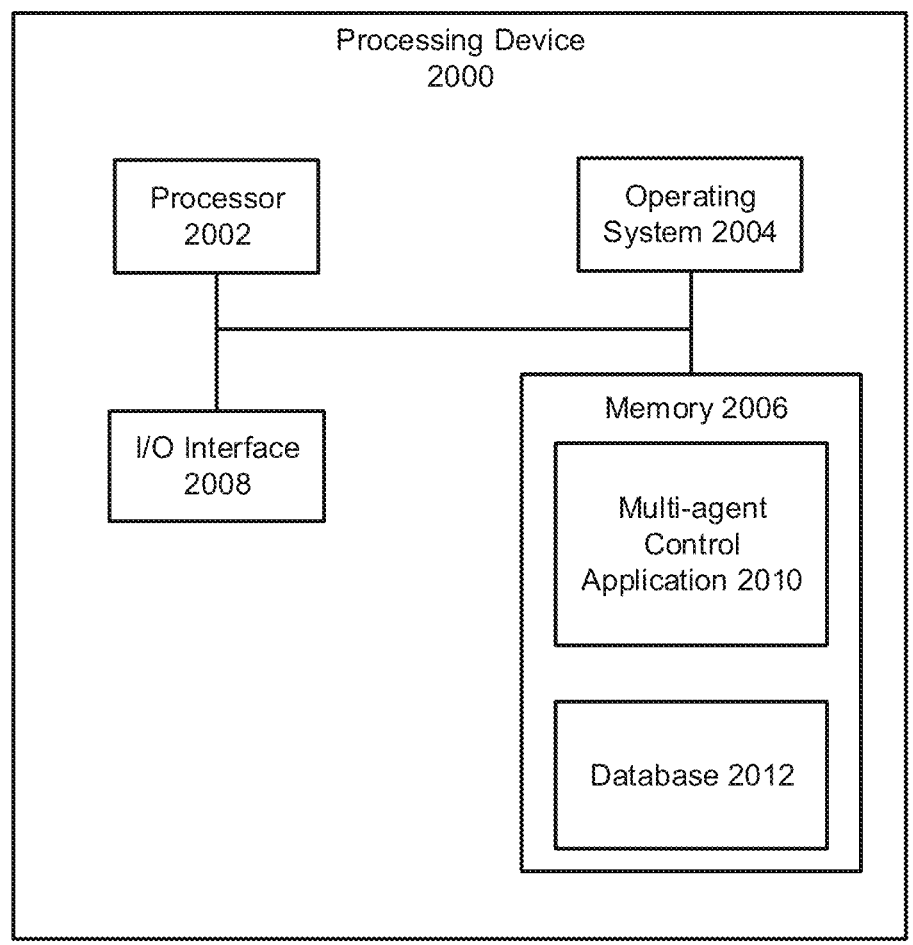
FIG. 20 is a diagram of an example processing system in accordance with some implementations.

FIG. 20 is a block diagram of an example processing device 2000 which may be used to implement one or more features described herein. In one example, device 2000 may be used to implement a computer device corresponding to one or more agents within a multi-agent system and perform appropriate method implementations described herein. Device 2000 can be any suitable computer system, server, or other electronic or hardware device. For example, the device 2000 can be programmable logic controller, a mainframe computer, desktop computer, workstation, portable computer, or electronic device (portable device, mobile device, cell phone, smart phone, tablet computer, television, TV set top box, personal digital assistant (PDA), media player, game device, wearable device, etc.). In some implementations, device 2000 includes a processor 2002, an operating system 2004, a memory 2006, and input/output (I/O) interface 2008.

Processor 2002 can be one or more processors and/or processing circuits to execute program code and control basic operations of the device 2000. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 806 is typically provided in device 2000 for access by the processor 2002, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 2002 and/or integrated therewith. Memory 2006 can store software operating on the device 2000 by the processor 2002, including an operating system 804, one or more observer-based control applications 2010, and a database 2012. In some implementations, applications 2010 can include instructions that enable processor 2002 to perform the functions described herein.

For example, application 2010 can include observer-based controller functions as described herein. Any of software in memory 2004 can alternatively be stored on any other suitable storage location or computer-readable medium. In addition, memory 2004 (and/or other connected storage device(s)) can store machine learning model (e.g., SVM) information, and/or other instructions and data used in the features described herein. Memory 2004 and any other type of storage (magnetic disk, optical disk, magnetic tape, or other tangible media) can be considered "storage" or "storage devices."

I/O interface 2008 can provide functions to enable interfacing the processing device 2000 with other systems and devices. For example, network communication devices, storage devices (e.g., memory and/or database), and input/output devices can communicate via interface 2008. In some implementations, the I/O interface 2008 can connect to interface devices including input devices (keyboard, pointing device, touchscreen, microphone, camera, scanner, etc.) and/or output devices (display device, speaker devices, printer, motor, etc.).

For ease of illustration, FIG. 20 shows one block for each of processor 2002, memory 2006, I/O interface 2008, and software block 2010. These blocks may represent one or more processors or processing circuitries, operating systems, memories, I/O interfaces, applications, and/or software modules. In other implementations, device 2000 may not have all of the components shown and/or may have other elements including other types of elements instead of, or in addition to, those shown herein.

In general, a computer that performs the processes described herein can include one or more processors and a memory (e.g., a non-transitory computer readable medium). The process data and instructions may be stored in the memory. These processes and instructions may also be stored on a storage medium such as a hard drive (HDD) or portable storage medium or may be stored remotely. Note that each of the functions of the described embodiments may be implemented by one or more processors or processing circuits. A processing circuit can include a programmed processor, as a processor includes circuitry. A processing circuit/circuitry may also include devices such as an application specific integrated circuit (ASIC) and conventional circuit components arranged to perform the recited functions. The processing circuitry can be referred to interchangeably as circuitry throughout the disclosure. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device.

The processor may contain one or more processors and even may be implemented using one or more heterogeneous processor systems. According to certain implementations, the instruction set architecture of the processor can use a reduced instruction set architecture, a complex instruction set architecture, a vector processor architecture, a very large instruction word architecture. Furthermore, the processor can be based on the Von Neumann model or the Harvard model. The processor can be a digital signal processor, an FPGA, an ASIC, a PLA, a PLD, or a CPLD. Further, the processor can be an x86 processor by Intel or by AMD; an ARM processor, a Power architecture processor by, e.g., IBM; a SPARC architecture processor by Sun Microsystems or by Oracle; or other known CPU architecture.

The functions and features described herein may also be executed by various distributed components of a system. For example, one or more processors may execute the functions, wherein the processors are distributed across multiple components communicating in a network. The distributed components may include one or more client and server machines, which may share processing in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed. A number of implementations have been described. Nevertheless, it will be understood that various modifications may be made without departing from the spirit and scope of this disclosure. For example, preferable results may be achieved if the steps of the disclosed techniques were performed in a different sequence, if components in the disclosed systems were combined in a different manner, or if the components were replaced or supplemented by other components. The functions, processes and algorithms described herein may be performed in hardware or software executed by hardware, including computer processors and/or programmable circuits configured to execute program code and/or computer instructions to execute the functions, processes and algorithms described herein. Additionally, an implementation may be performed on modules or hardware not identical to those described. Accordingly, other implementations are within the scope that may be claimed.

Moreover, the present disclosure is not limited to the specific circuit elements described herein, nor is the present disclosure limited to the specific sizing and classification of these elements. For example, the skilled artisan will appreciate that the systems described herein may be adapted based on the requirements of a contemplated control system.

Figure 21:
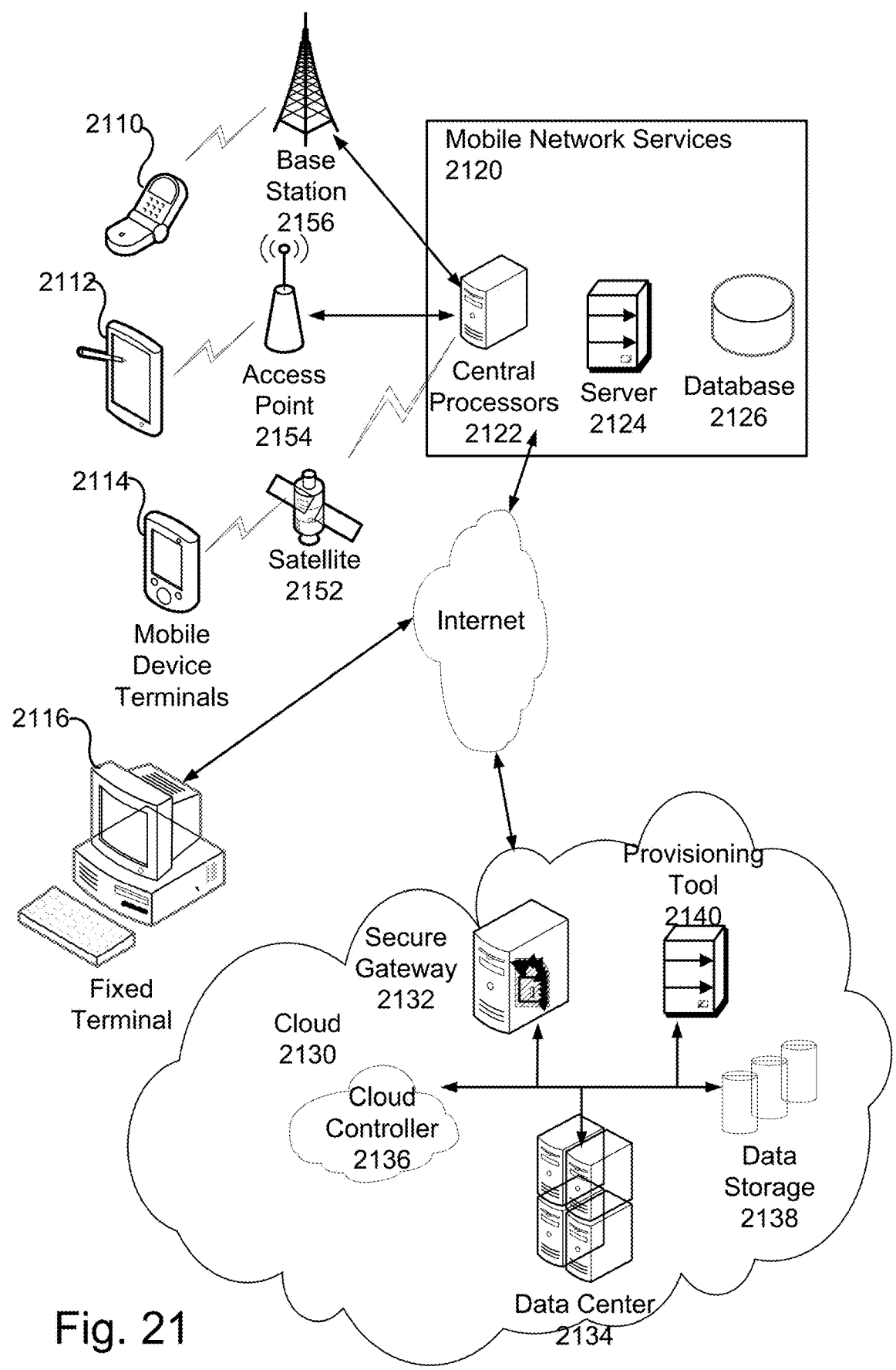
FIG. 21 is a diagram of an example network of devices in accordance with some implementations.

The functions and features described herein may also be executed by various distributed components of a system. For example, one or more processors may execute these system functions, wherein the processors are distributed across multiple components communicating in a network. The distributed components may include one or more client and server machines, which may share processing, as shown in FIG. 21, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

The invention claimed is:

1. A computer-implemented method for controlling a multi-agent autonomous vehicle system including two or more autonomous vehicle systems using group consensus protocol, the two or more systems being connected via a network, the method comprising:
   dividing each of the two or more autonomous vehicle systems into two or more subgroups each having one or more agents, wherein each agent includes one or more processors in an autonomous vehicle;
   determining two or more consensus states, wherein each subgroup of the two or more subgroups has a single objective function known to each agent of the subgroup, wherein each consensus state minimizes the single objective function corresponding to the subgroup, and wherein the two or more consensus states satisfy conditions corresponding to a sum of a first derivative of the single objective function for each agent of each corresponding subgroup being equal to zero; and
   controlling the two or more autonomous vehicle systems according to the two or more consensus states.

2. The method of claim 1, wherein the two or more autonomous vehicle systems are stable at the two or more consensus states.

3. The method of claim 1, wherein the two or more autonomous vehicle systems are represented by one of a single integrator or a double integrator.

4. The method of claim 1, wherein input to the two or more autonomous vehicle systems is bounded.

5. The method of claim 1, wherein the single objective function is a decentralized objective function.

6. The method of claim 1, further comprising receiving input at the two or more autonomous vehicle systems, wherein the input includes saturated input.

7. The method of claim 1, further comprising receiving input at the two or more autonomous vehicle systems, wherein the input includes unsaturated input.

8. A multi-agent system comprising:
   two or more computer-based systems controlled according to a computerized control system including a group consensus protocol, the two or more computer-based systems being connected via a computer data network, wherein each of the two or more computer-based systems include two or more subgroups each having one or more agents, wherein the one or more agents comprise one or more corresponding processors, and
   wherein the computerized control system is configured to perform operations including:
   determining two or more consensus states, wherein each subgroup of the two or more subgroups has a single objective function known to each agent of the subgroup, wherein each consensus state minimizes the single objective function corresponding to the subgroup, and wherein the two or more consensus states satisfy conditions corresponding to a sum of a first derivative of the single objective function for each agent of each corresponding subgroup being equal to zero; and controlling the two or more computer-based systems according to the two or more consensus states.

9. The multi-agent system of claim 8, wherein the two or more computer-based systems are stable at the two or more consensus states.

10. The multi-agent system of claim 8, wherein the two or more computer-based systems are represented by one of a single integrator or a double integrator.

11. The multi-agent system of claim 8, wherein input to the two or more computer-based systems is bounded.

12. The multi-agent system of claim 8, wherein the single objective function is a decentralized objective function.

13. The multi-agent system of claim 8, wherein the operations further comprise receiving input at the two or more computer-based systems, wherein the input includes saturated input.

14. The multi-agent system of claim 8, wherein the operations further comprise receiving input at the two or more computer-based systems, wherein the input includes unsaturated input.

15. A non-transitory computer readable medium having instructions stored therein that, when executed by one or more processors, cause the one or more processors to perform a method to control a multi-agent system including two or more systems using group consensus protocol, the two or more systems being connected via a network, the method comprising:

dividing each of the two or more systems into two or more subgroups each having one or more agents;

determining two or more consensus states, wherein each subgroup of the two or more subgroups has a single objective function known to each agent of the subgroup, wherein each consensus state minimizes the single objective function corresponding to the subgroup, and wherein the two or more consensus states satisfy conditions corresponding to a sum of a first derivative of the single objective function for each agent of each corresponding subgroup being equal to zero; and controlling the two or more systems according to the two or more consensus states.

16. The non-transitory computer readable medium of claim 15, wherein the two or more systems are stable at the two or more consensus states.

17. The non-transitory computer readable medium of claim 15, wherein the two or more systems are represented by one of a single integrator or a double integrator.

18. The non-transitory computer readable medium of claim 15, wherein the single objective function is a decentralized objective function.

19. The non-transitory computer readable medium of claim 15, wherein the method further comprises receiving input at the two or more systems, wherein the input includes saturated input.

20. The non-transitory computer readable medium of claim 15, wherein the method further comprises receiving input at the two or more systems, wherein the input includes unsaturated input.

* * * * *